(12) United States Patent
Katayama

(10) Patent No.: US 7,564,762 B2
(45) Date of Patent: Jul. 21, 2009

(54) OPTICAL HEAD DEVICE AND OPTICAL INFORMATION RECORDING OR REPRODUCING DEVICE

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 717 days.

(21) Appl. No.: 11/149,407

(22) Filed: Jun. 10, 2005

(65) Prior Publication Data

US 2005/0276206 A1 Dec. 15, 2005

(30) Foreign Application Priority Data

Jun. 11, 2004 (JP) ............................. 2004-173548

(51) Int. Cl.
*G11B 7/12* (2006.01)
(52) U.S. Cl. ............................. 369/112.03; 369/53.23; 369/112.12
(58) Field of Classification Search ............... 369/44.37, 369/53.28, 53.23, 112.01, 112.03, 112.04, 369/112.07, 112.12, 109.01, 110.03
See application file for complete search history.

(56) References Cited

U.S. PATENT DOCUMENTS

| | | | | |
|---|---|---|---|---|
| 5,351,230 A | * | 9/1994 | Takeda et al. | 369/112.12 |
| 5,737,296 A | * | 4/1998 | Komma et al. | 369/44.23 |
| 5,748,599 A | * | 5/1998 | Yamamoto et al. | 369/112.12 |
| 5,886,964 A | | 3/1999 | Fujita | |
| 6,125,087 A | * | 9/2000 | Ohnishi et al. | 369/44.23 |
| 6,282,164 B1 | | 8/2001 | Katayama | |
| 6,400,671 B2 | * | 6/2002 | Hayashi et al. | 369/112.12 |
| 6,418,107 B1 | * | 7/2002 | Sano et al. | 369/109.02 |
| 6,707,773 B2 | * | 3/2004 | Katayama | 369/53.19 |
| 6,754,146 B2 | * | 6/2004 | Ma et al. | 369/44.41 |
| 6,940,799 B1 | * | 9/2005 | Ma et al. | 369/53.25 |
| 2002/0159378 A1 | * | 10/2002 | Lee et al. | 369/112.12 |
| 2002/0181353 A1 | * | 12/2002 | Katayama | 369/44.37 |
| 2003/0179667 A1 | * | 9/2003 | Yoshinaka et al. | 369/44.41 |
| 2005/0018552 A1 | * | 1/2005 | Tomisawa | 369/44.12 |
| 2005/0030877 A1 | * | 2/2005 | Horiyama | 369/112.06 |

FOREIGN PATENT DOCUMENTS

| | | |
|---|---|---|
| JP | 09-081942 | 3/1997 |
| JP | 11-134677 | 5/1999 |
| JP | 2003-077151 | 3/2003 |

* cited by examiner

*Primary Examiner*—Wayne R Young
*Assistant Examiner*—Thomas D Alunkal
(74) *Attorney, Agent, or Firm*—Foley & Lardner LLP

(57) ABSTRACT

A diffractive optical element for dividing a light emitted from a light source into a main beam and at least one sub-beam, an objective lens for focusing the beams on a disk-shaped optical recording medium with spiral tracks, and a photodetector for receiving the beams reflected from the optical recording medium are provided. At least a part of the diffractive optical element includes a diffraction grating divided into four or more plural areas by three or more plural lines in parallel with a direction corresponding to a tangential direction of the optical recording medium, and in two adjacent areas among the plural areas, phases of the lattices are shifted by n to each other.

20 Claims, 22 Drawing Sheets

FIG. 4 PRIOR ART
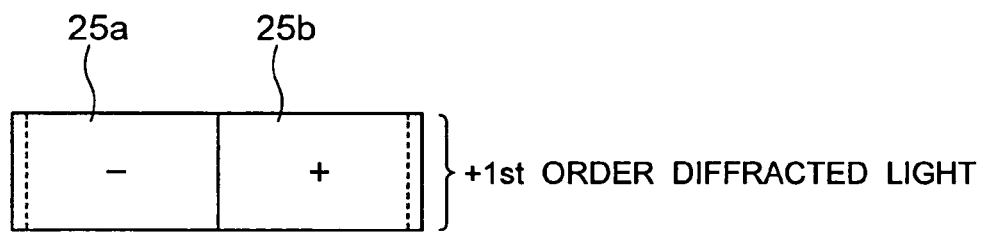
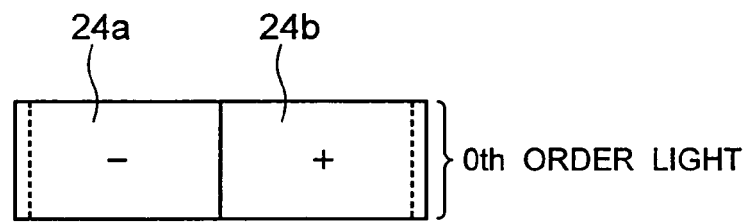
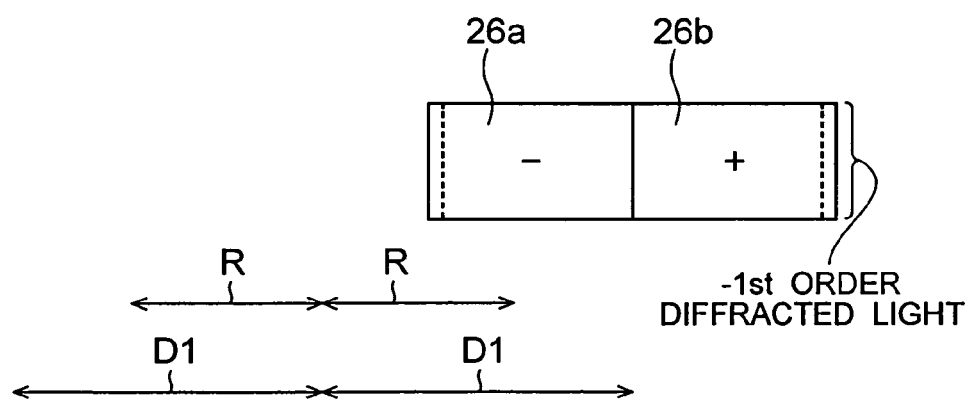

FIG. 5  PRIOR ART
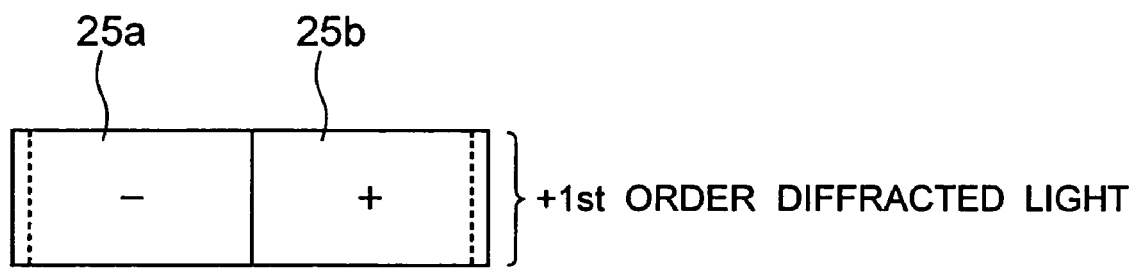
+1st ORDER DIFFRACTED LIGHT
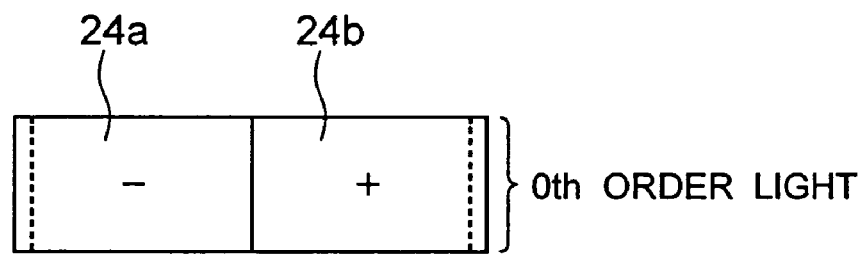
0th ORDER LIGHT
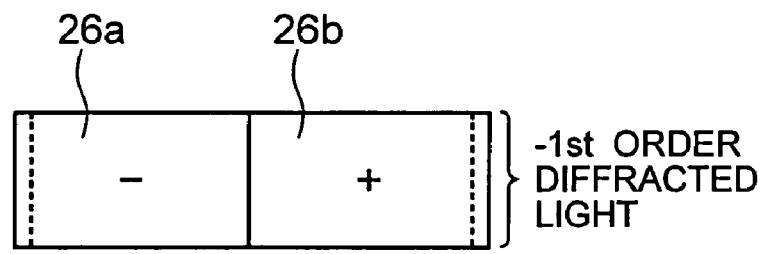
-1st ORDER DIFFRACTED LIGHT
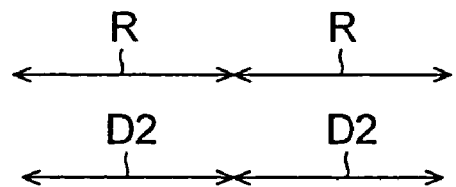

FIG. 6 PRIOR ART
(a)
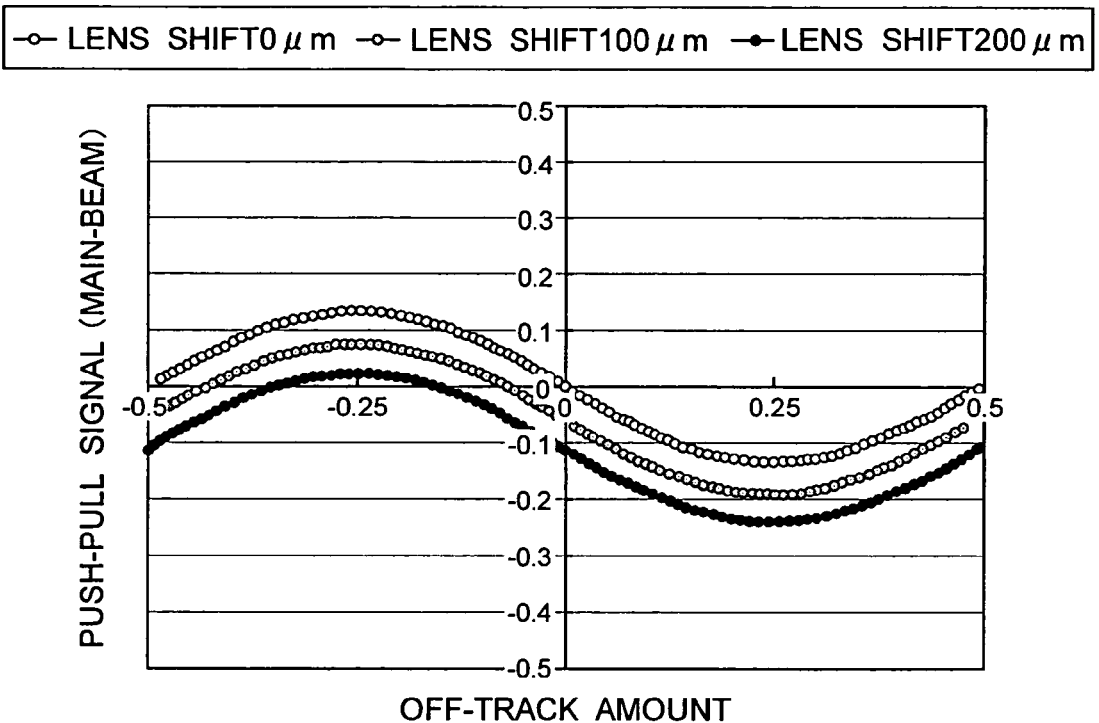
(b)
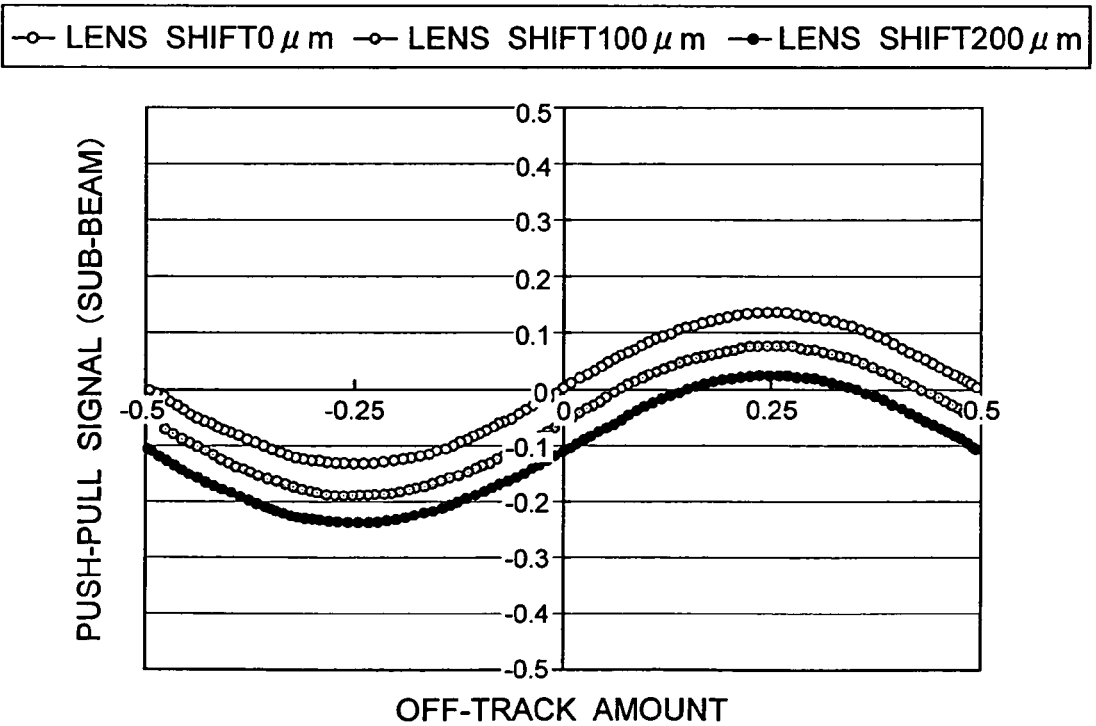

FIG. 7  PRIOR ART
(a)
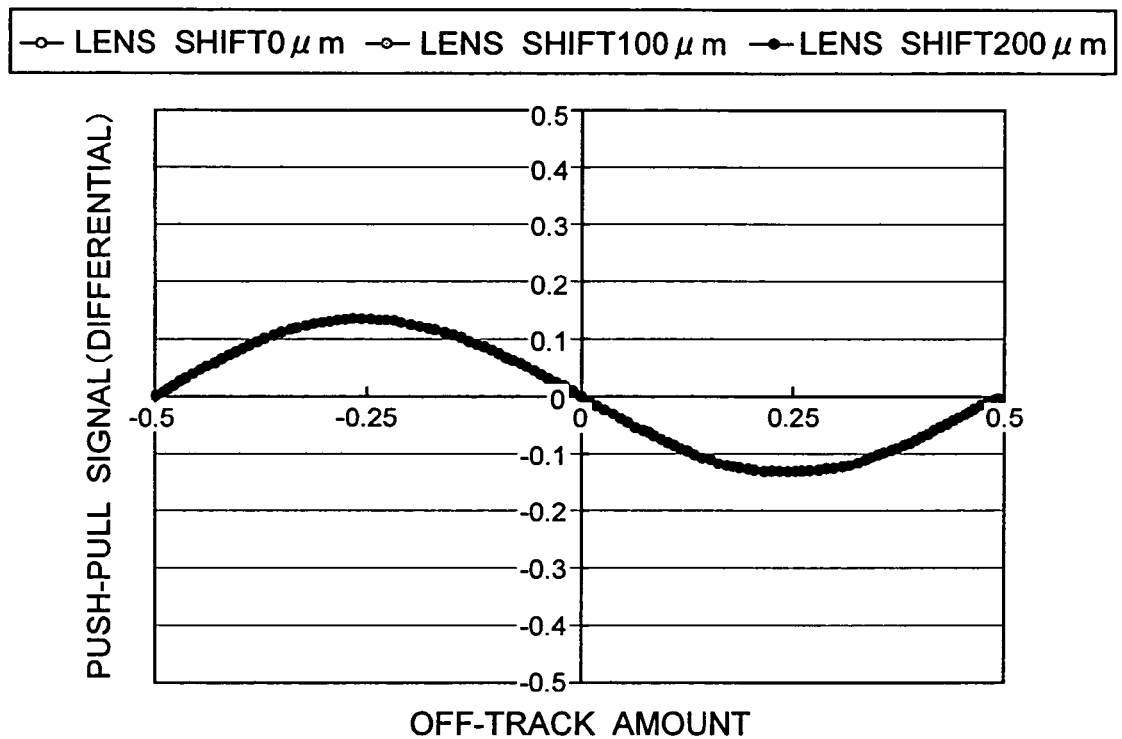
(b)
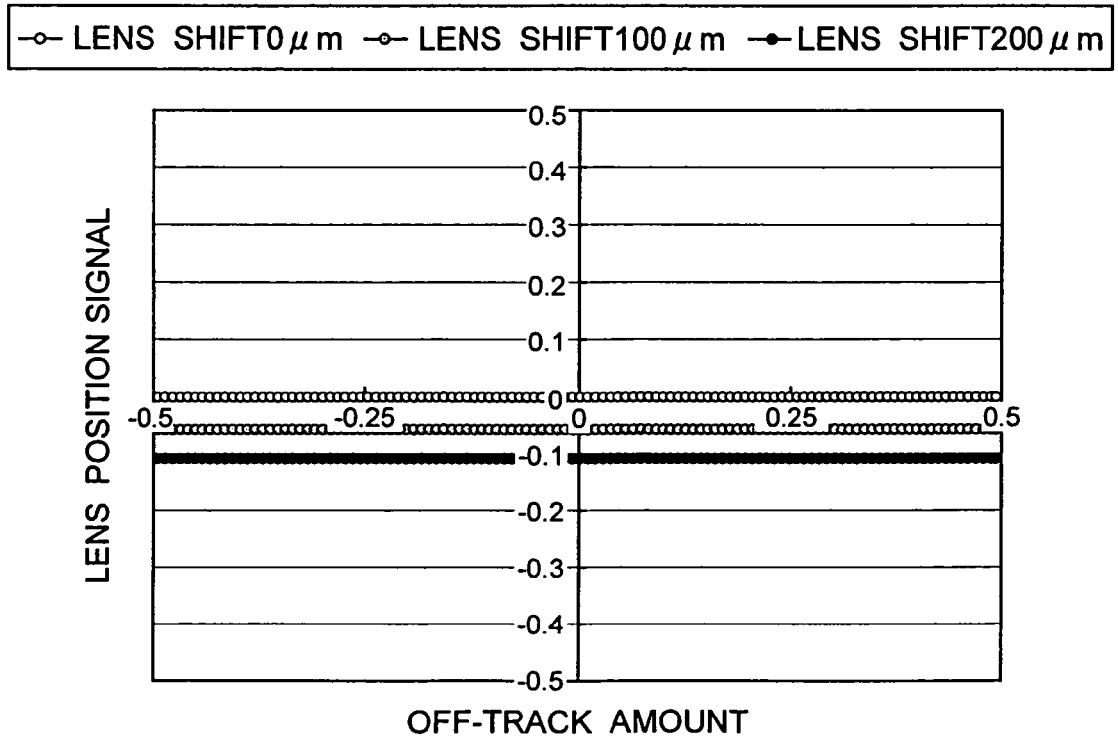

FIG. 8 PRIOR ART
(a)
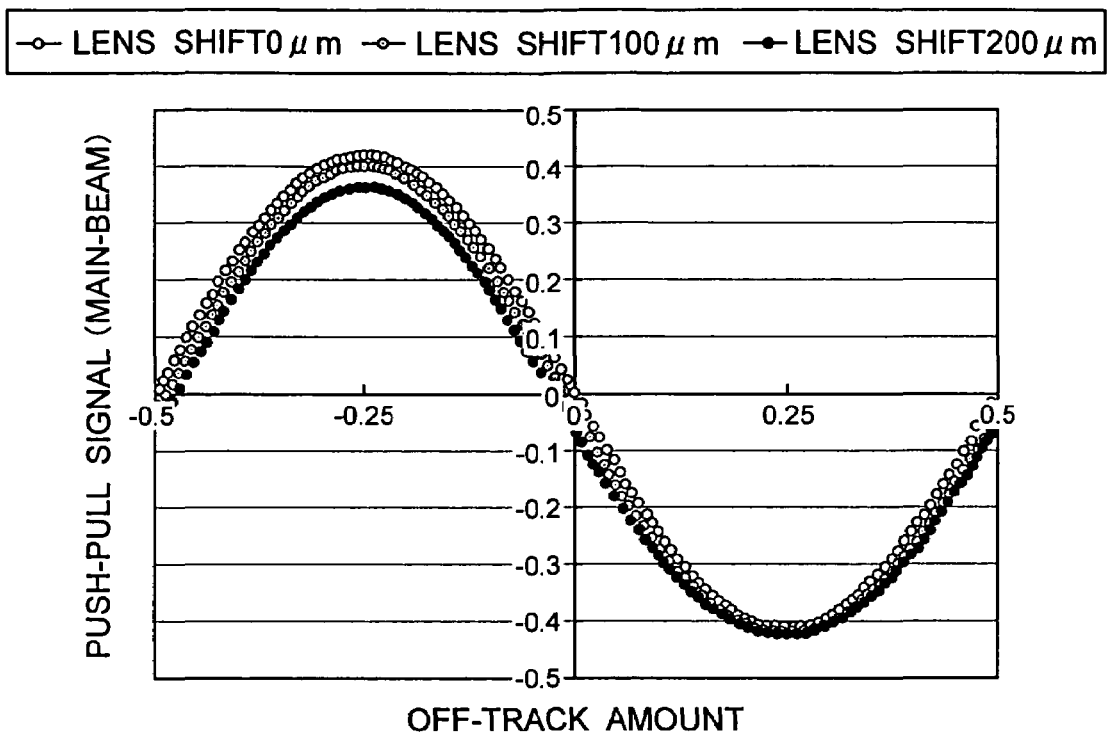
(b)
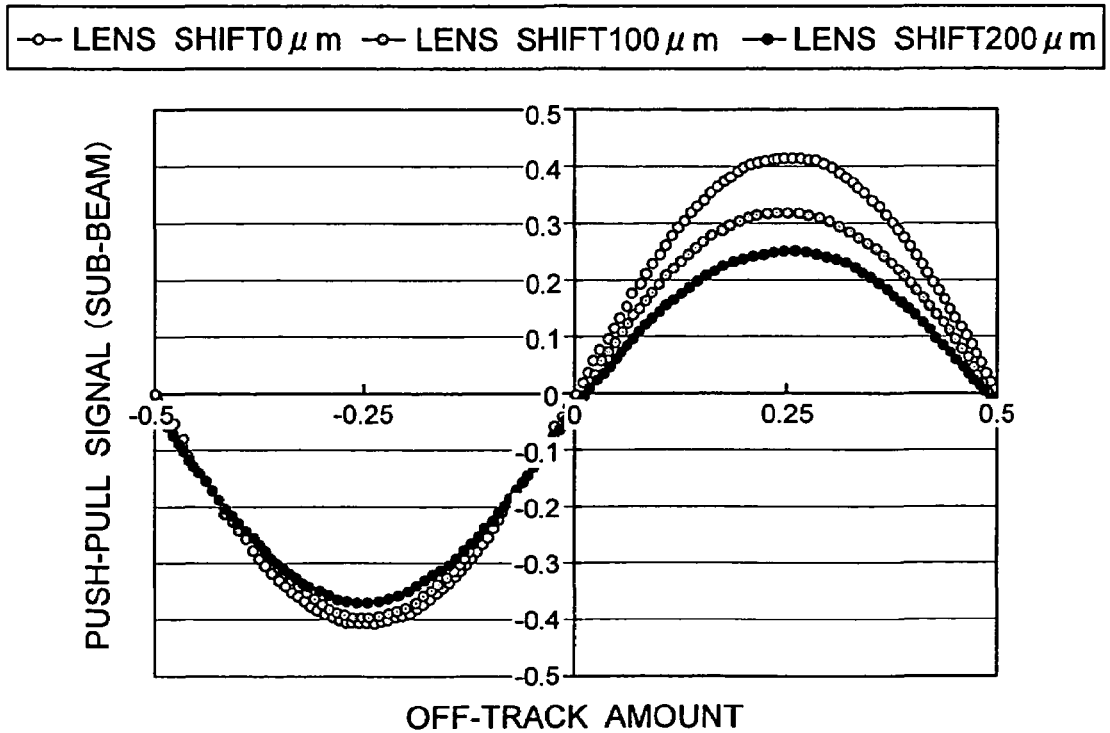

FIG. 9 PRIOR ART
(a)
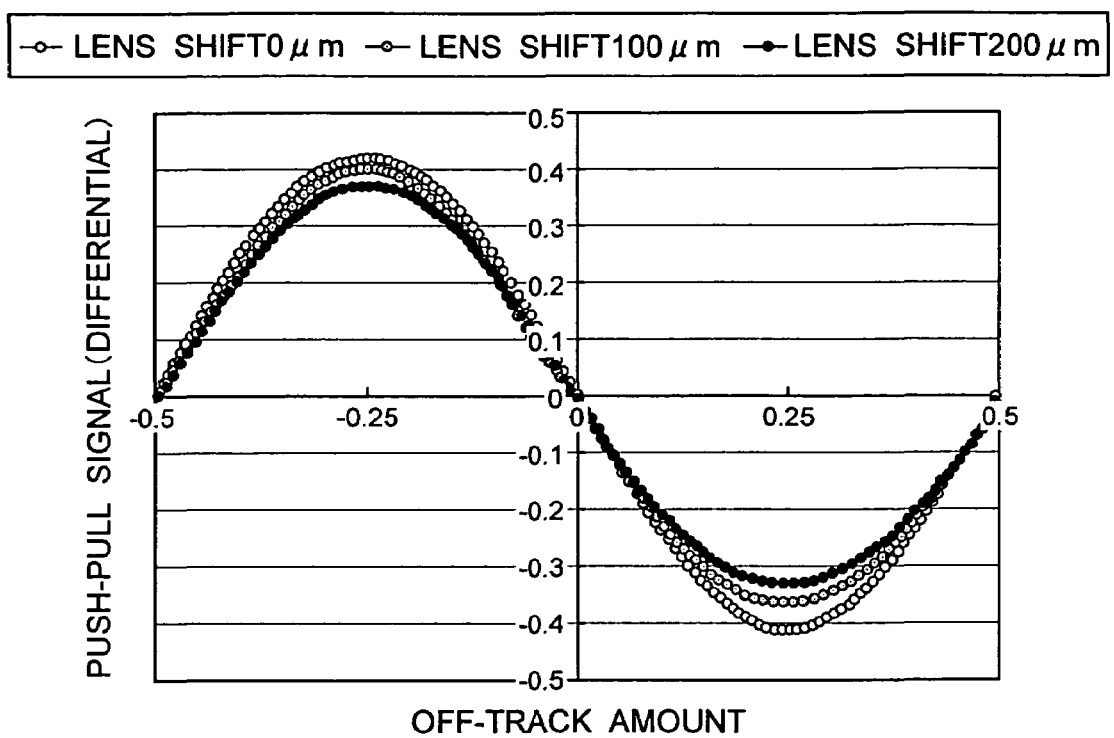
(b)
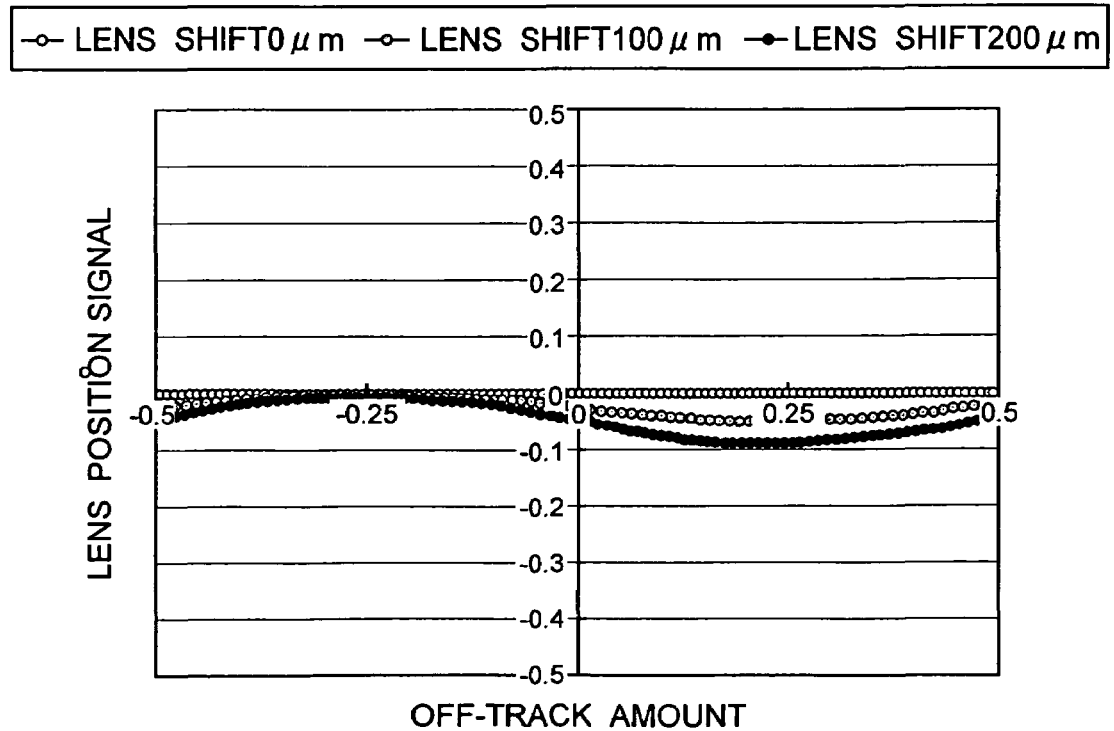

FIG.12
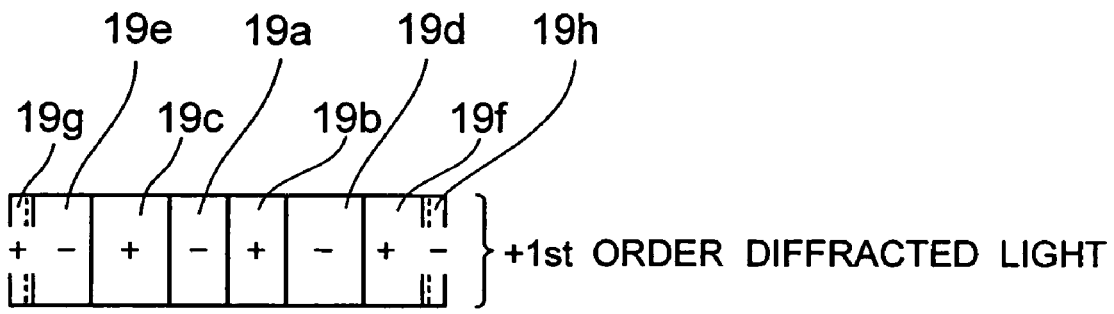
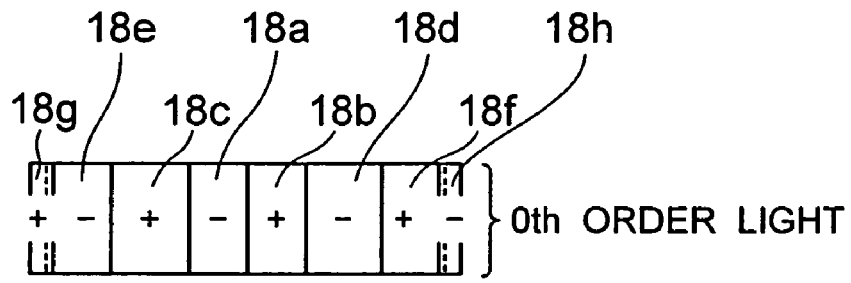
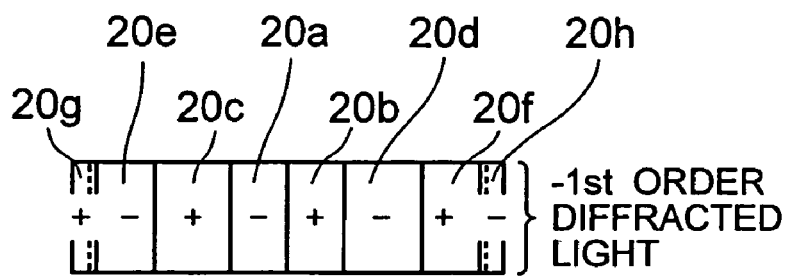
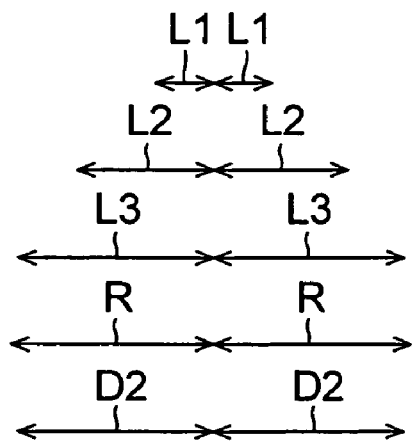

FIG.13
(a)
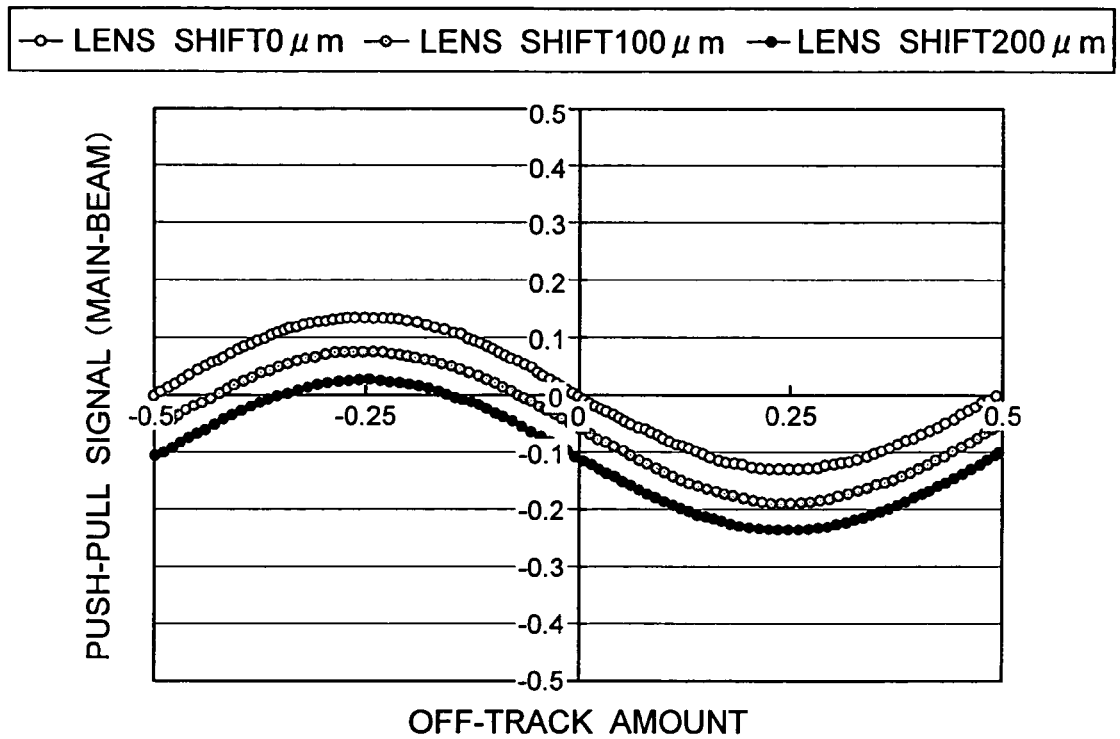
(b)
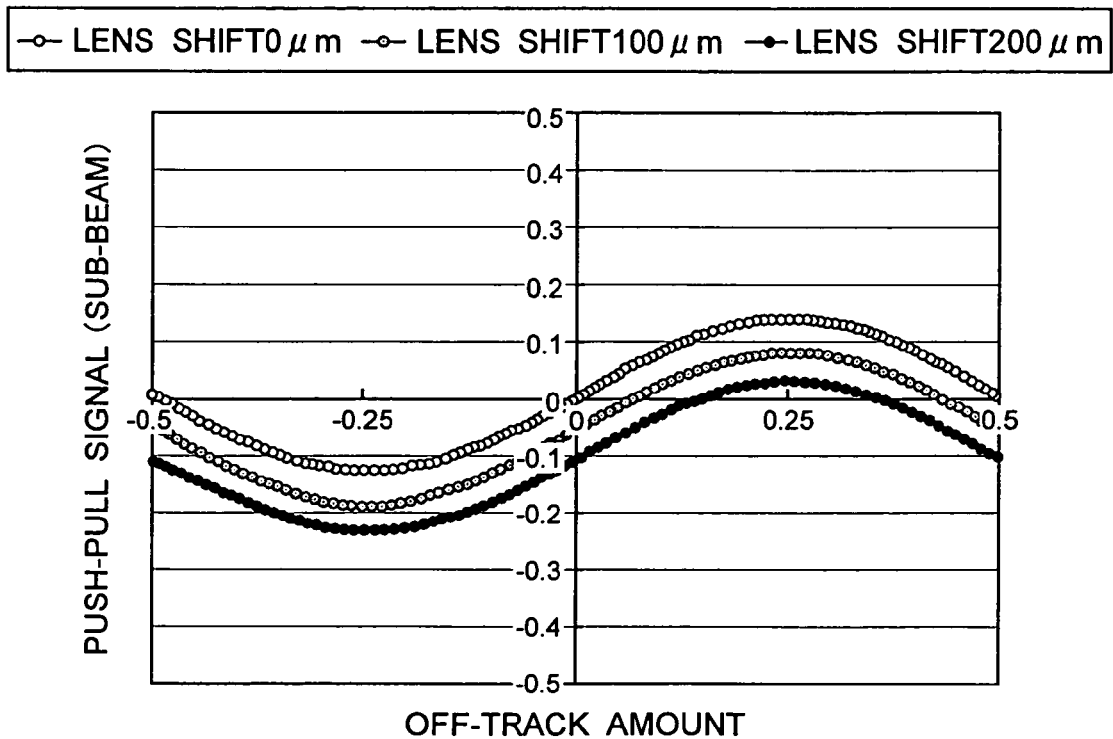

FIG.14
(a)
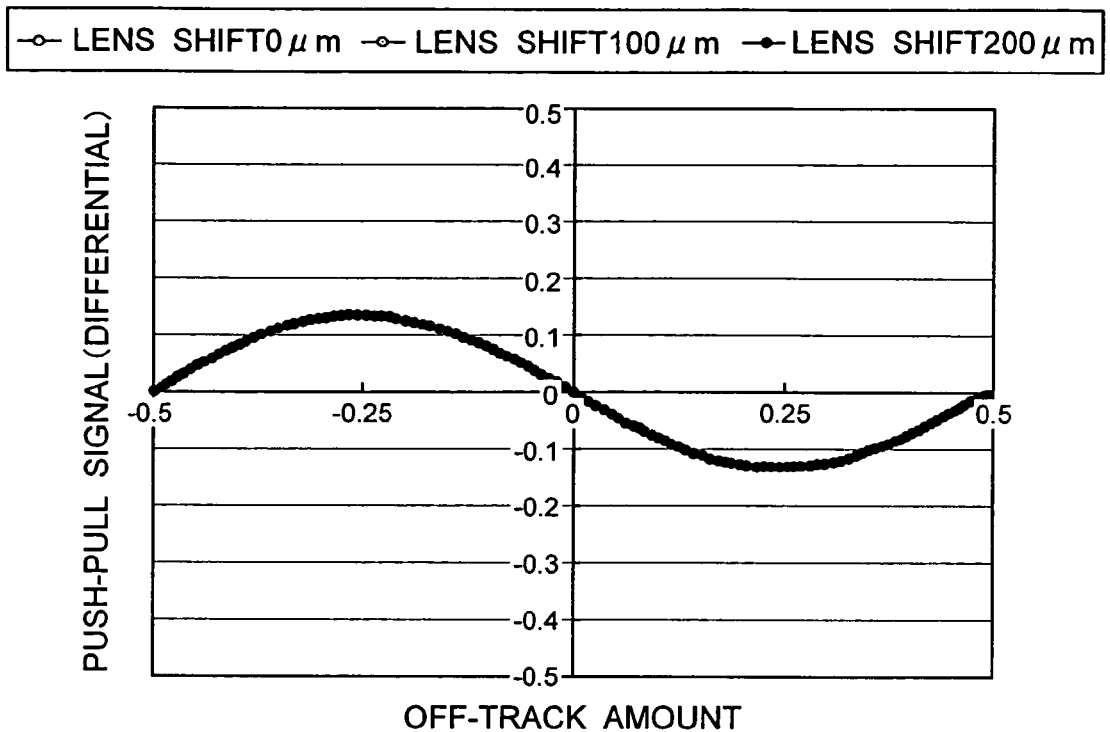
(b)
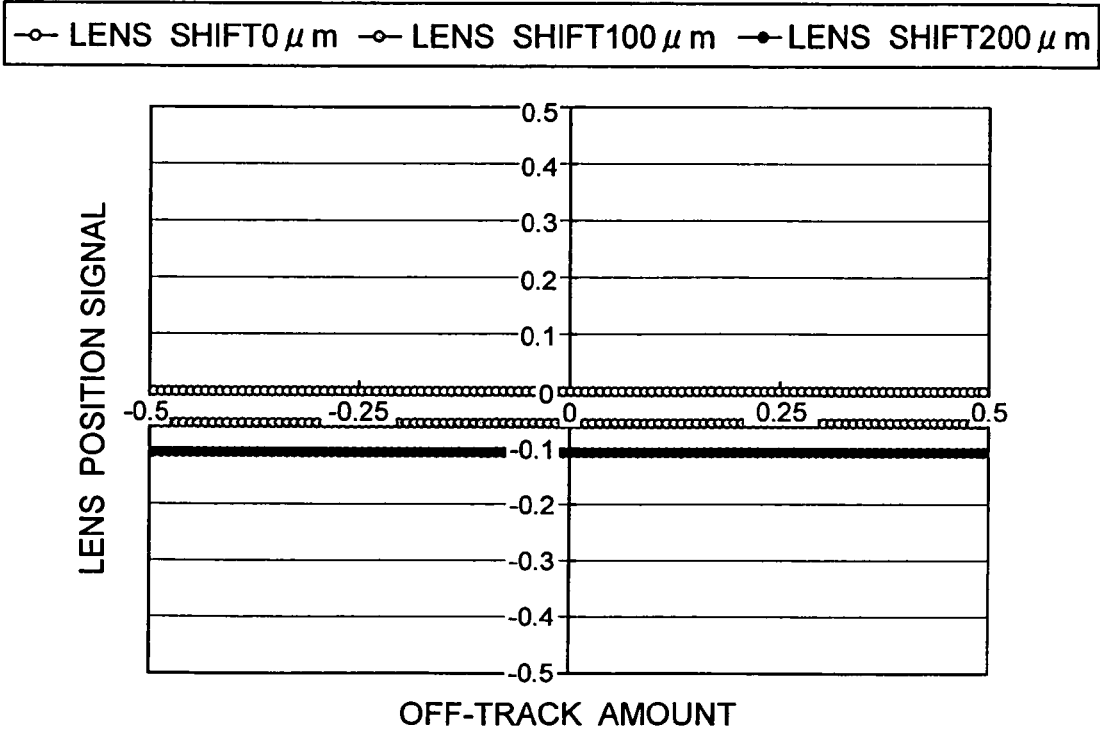

FIG.15
(a)
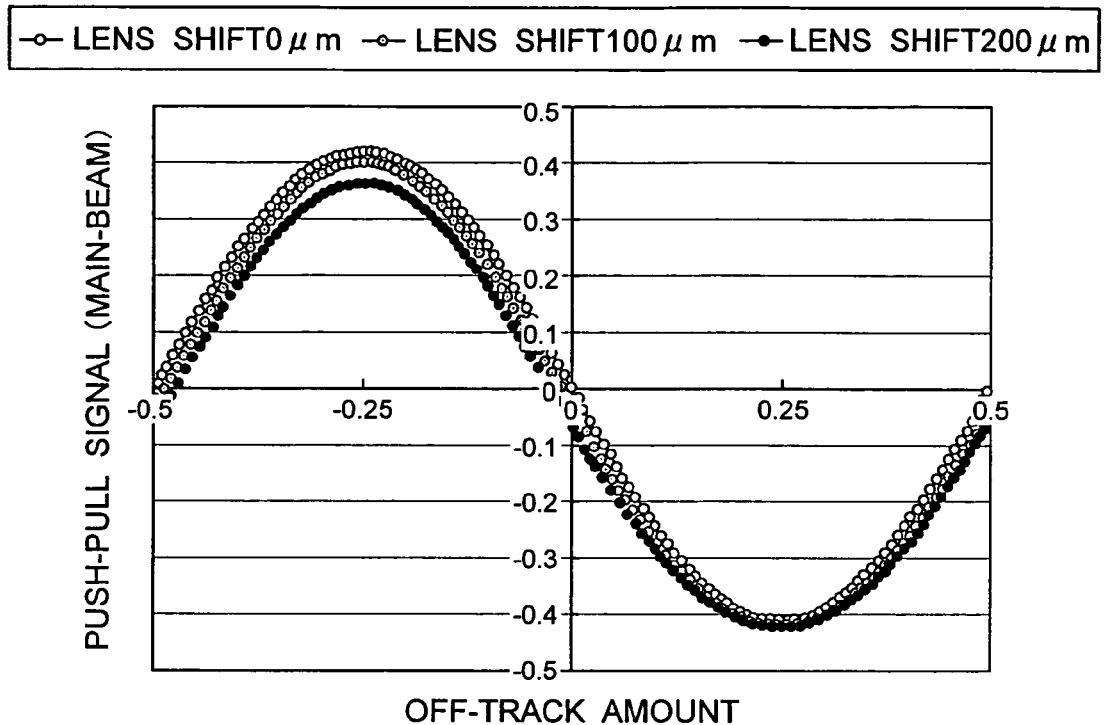
(b)
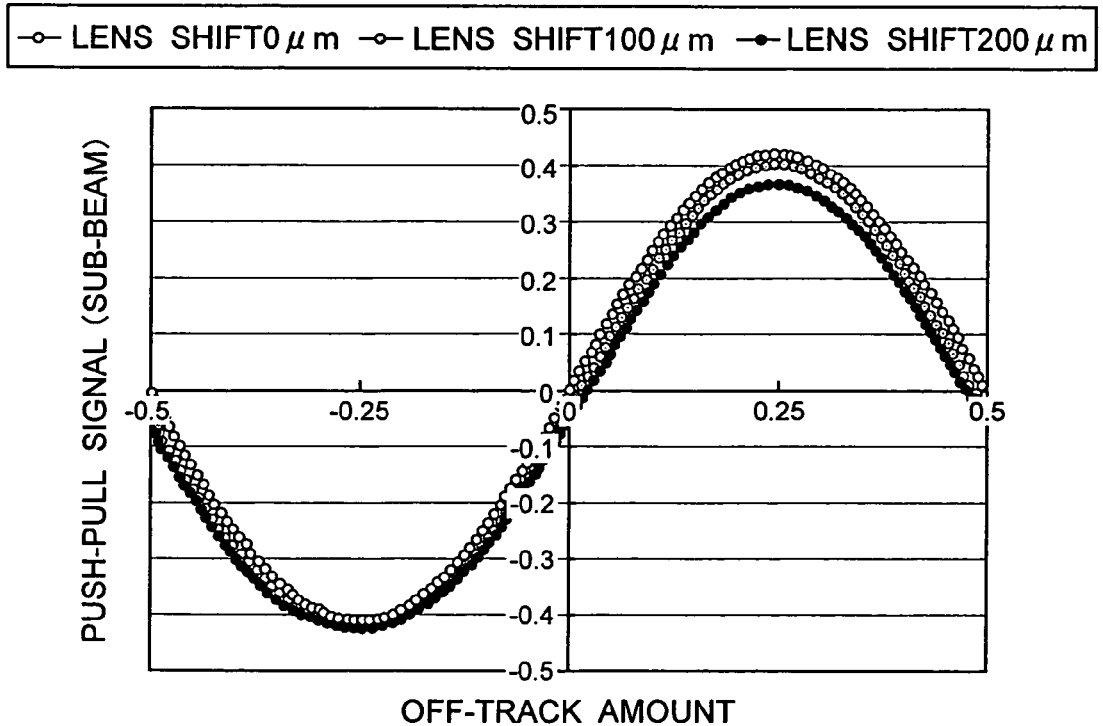

FIG.16
(a)
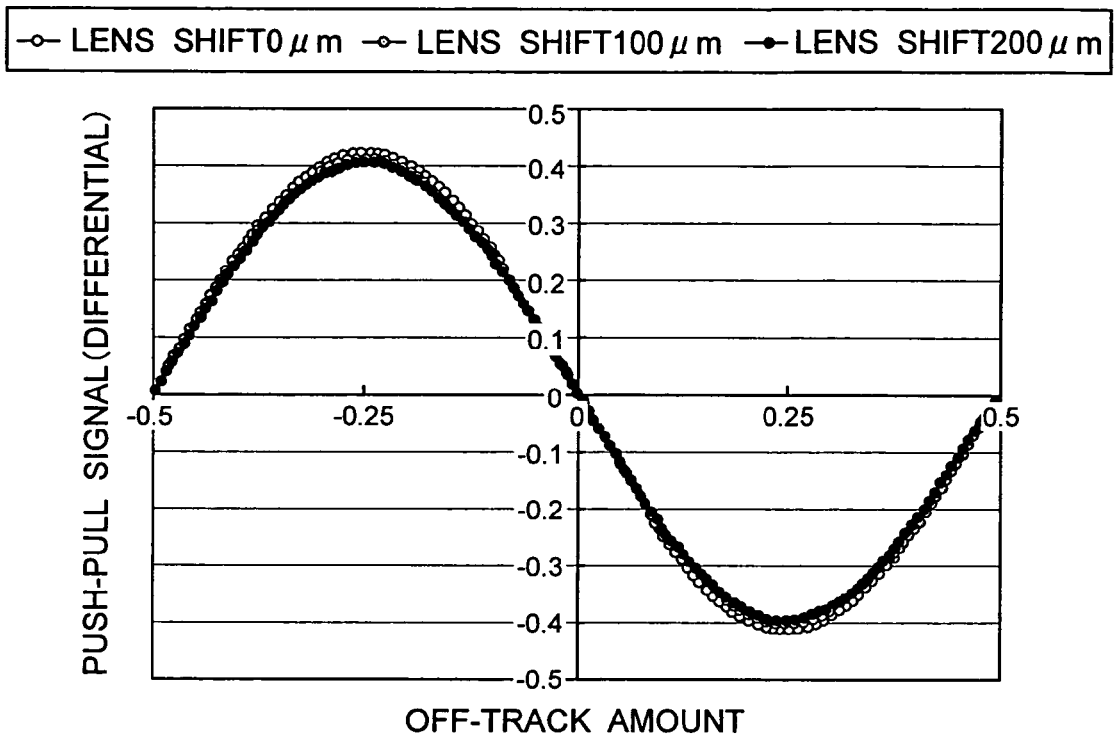
(b)
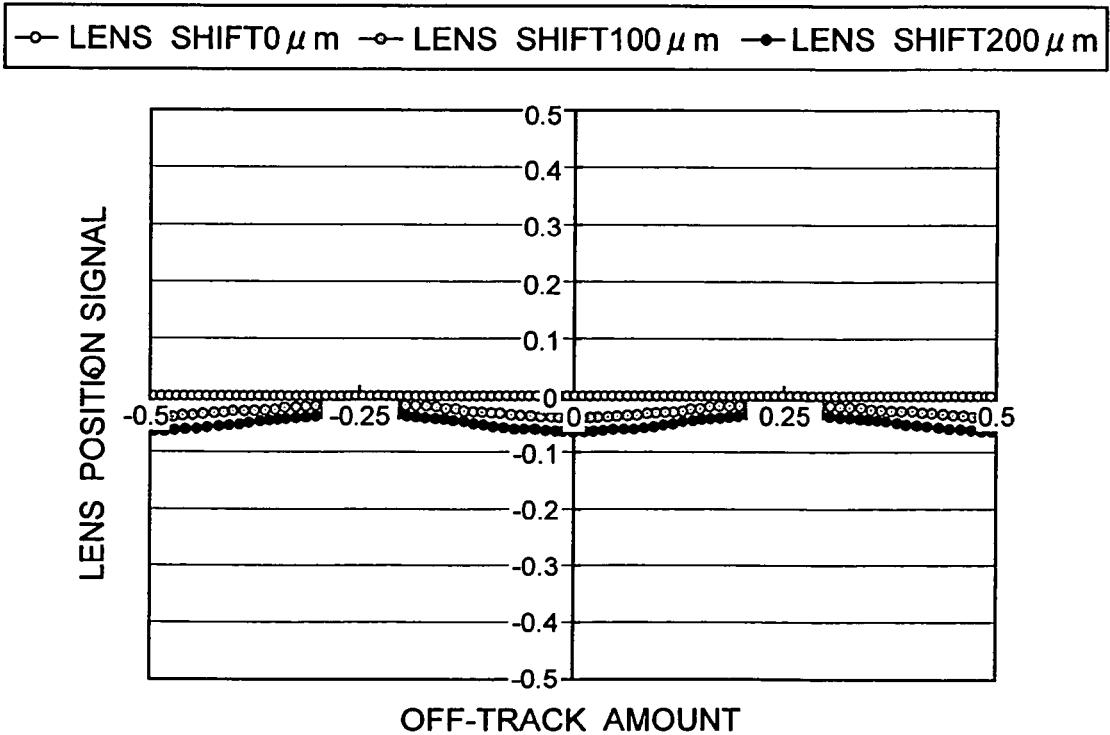

FIG.19
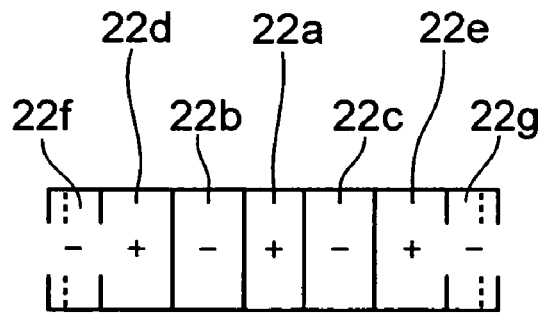
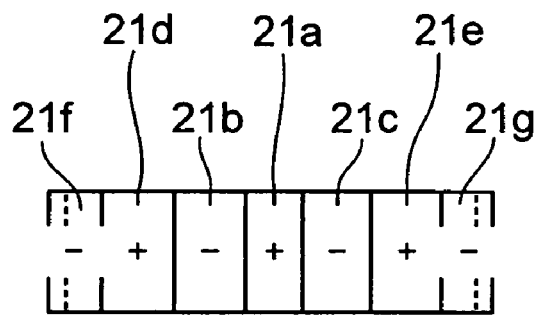
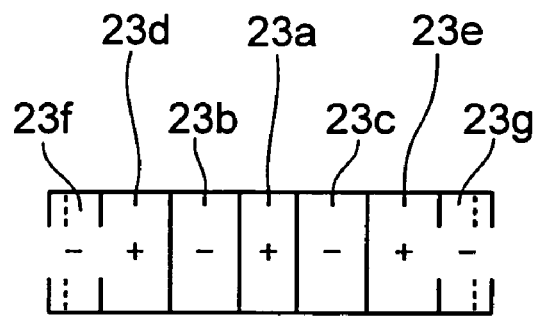
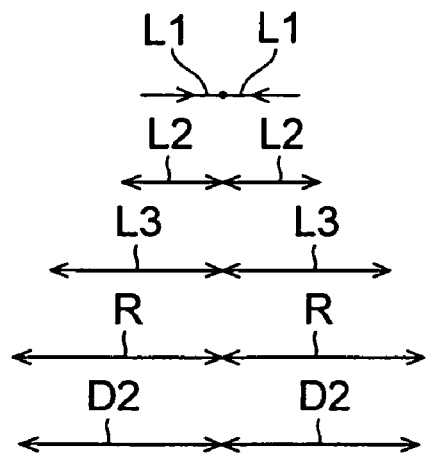

OPTICAL HEAD DEVICE AND OPTICAL INFORMATION RECORDING OR REPRODUCING DEVICE

BACKGROUND OF THE INVENTION

1. Field of the Invention

The present invention relates to an optical head device and an optical information recording or reproducing device for performing recording or reproducing on optical recording medium. In particular, the present invention relates to an optical head device and an optical information recording or reproducing device capable of obtaining fine track error signals and lens position signals even though there are lens shifts, with respect to plural types of optical recording medium having different pitches of grooves.

2. Related Art

In write-once and rewritable optical recording medium, grooves for tracking are formed generally. When detecting tracking error signals with respect to these optical recording medium, detections are typically performed by means of a push-pull method. However, a tracking error signal detected by the push-pull method generates an offset when an objective lens of the optical head device shifts in a radial direction of the optical recording medium. In order to prevent deterioration in recording or reproducing characteristics due to the offset caused by such a lens shift, an optical head device and an optical information recording or reproducing device are required to be devised so as not to generate an offset caused by a lens shift in a track error signal.

On the other hand, when an optical head device performs a track follow operation to an optical recording medium, an objective lens of the optical head device follows a track of the optical recording medium in accordance with a track error signal, and the optical system of the optical head device, except for the objective lens, follows the objective lens such that the objective lens will not be shifted from a mechanically neutral position with respect to the optical system of the optical head device except for the objective lens. Further, when the optical head device performs a seek operation to the optical recording medium, in general, the objective lens is fixed at a mechanically neutral position with respect to the optical system of the optical head device except for the objective lens, and the optical system of the optical head device except for the objective lens moves in a radial direction of the optical recording medium corresponding to a seek signal. In order to perform such a track follow operation and a seek operation stably, an optical head device and an optical information recording or reproducing device are required to be devised so as to detect a lens position signal indicating a shifted amount from the mechanically neutral position of the optical lens.

In general, when viewed from the side of an incident light to an optical recording medium, dented parts of grooves formed in the optical recording medium are called "grooves", and protruded parts are called "lands". Write-once and rewritable optical recording medium include: optical recording medium of a groove recording system such as DVD-R (Digital Versatile Disc-Recordable) and DVD-RW (Digital Versatile Disc-Rerecordable) in which recording or reproducing is performed only to grooves; and optical recording medium of a land/groove recording system such as DVD-RAM (Digital Versatile Disc-Rewritable) in which recording or reproducing is performed to both lands and grooves. Typically, the pitches of grooves in optical recording medium of the groove recording system are narrower than the pitches of grooves in optical recording medium of the land/groove recording system. Optical head devices and optical information recording or reproducing devices are required to be devised so as to cope with a plurality of optical recording medium having different pitches of grooves.

As an optical head device capable of detecting a lens position signal while not generating an offset due to a lens shift in a tracking error signal with respect to plural types of optical recording medium with different pitches of grooves, there may be one described in Japanese Patent Application Laid-open No. 9-81942 (Patent Document 1).

FIG. 1 shows the configuration of an optical head device described in Patent Document 1.

Light emitted from a semiconductor laser 1 is collimated by a collimator lens 2. The collimated light is then divided into three light beams by a diffractive optical element 3e which are 0th-order light as a main beam and ± 1st-order diffracted lights as sub-beams. The light beams enter a polarizing beam splitter 4 as P polarized light and substantially 100% transmit therethrough. Then, they transmit through a quarter-wave plate 5 to be converted from linearly polarized light to circularly polarized light thereby to be focused onto a disk 7 by an objective lens 6. Three light beams reflected from the disk 7 transmit inversely through the objective lens 6 and then transmit the quarter-wave plate 5 to be converted from the circularly polarized light to linearly polarized light whose polarization direction is orthogonal to that in the outward path. The light beams then enter the polarizing beam splitter 4 as S polarized light and substantially 100% is reflected thereby to be received by a photodetector 10 through a cylindrical lens 8 and lens 9. The photodetector 10 is placed between the two focal lines of the cylindrical lens 8 and lens 9.

FIG. 2 is a plan view of the diffractive optical element 3e. The diffractive optical element 3e is so configured as to include a diffraction grating divided into two areas 15a and 15b by a line passing through the optical axis of an incident light and in parallel with a direction corresponding to a tangential direction of the disk 7. The directions of the lattices in the diffraction gratings are in parallel with the direction corresponding to the radial direction of the disk 7 and its pattern is in a linear form at even intervals. In the areas 15a and 15b, intervals of the lattices are equal. The phase of the lattice in the area 15a and the phase of the lattice in the area 15b are shifted by $\pi$ to each other. Note that a dotted line in FIG. 2 shows the effective diameter of the objective lens 6.

Now, it is assumed that the wavelength of the semiconductor laser 1 is $\lambda$, the diffraction rate of the lattice is n, the height of the lattice is h, and $h=0.115\lambda/(n-1)$. Here, the transmission factor of the lattice is 87.5%, and ± 1st-order diffraction efficiency is about 5.1%, respectively. That is, the lights made incident on the areas 15a and 15b are transmitted about 87.5% as a 0th-order light, and are diffracted about 5.1% as ± 1st-order diffracted lights, respectively. The phase of the +1st-order diffracted light from the area 15a and the phase of the +1st-order diffracted light from the area 15b are shifted by n to each other. Similarly, the phase of the −1st-order diffracted light from the area 15a and the phase of the −1st-order diffracted light from the area 15b are shifted by $\pi$ to each other.

On the disk 7, there are formed three focused spots, corresponding to the 0th-order light, the +1st-order diffracted light and the −1st-order diffracted light from the diffractive optical element 3e. The three focused spots are located on the same track on the disk 7.

FIG. 3 shows the pattern of the light receiving sections of the photodetector 10 and the configuration of the light spots on the photodetector 10. A light spot 16a corresponds to 0th-order light from the diffractive optical element 3e, and is received by four divided light receiving sections 17a to 17d which are divided by division line in parallel with the direction corresponding to the tangential direction of the disk passing through the optical axis and the division line in parallel with the direction corresponding to the radial direction. A light spot 16b corresponds to +1st-order diffracted light from the diffractive optical element 3e, and is received by four divided light receiving sections 17e to 17h which are divided by division line in parallel with the direction corresponding to the tangential direction of the disk passing through the optical axis and the division line in parallel with the direction corresponding to the radial direction. A light spot 16c corresponds to −1st-order diffracted light from the diffractive optical element 3e, and is received by four divided light receiving sections 17i to 17l which are divided by division line in parallel with the direction corresponding to the tangential direction of the disk passing through the optical axis and the division line in parallel with the direction corresponding to the radial direction. The row of the three focused spots on the disk 7 is in the tangential direction, however, the row of the light spots 16a, 16b, 16c on the photodetector 10 is in the radial direction due to the effect of the cylindrical lens 8 and the lens 9.

When outputs from the light receiving sections 17a to 17l are indicated as V17a to V17l, respectively, a focus error signal is obtained from a calculation of FE=(V17a+V17d)−(V17b+V17c) by means of an astigmatism method. A push-pull signal of the light spot 16a, or the main beam, is obtained from a calculation of PPM=(V17a+V17b)−(V17c+V17d). A Push-pull signal of the optical spots 16b and 16c, or the sub-beams, is obtained from a calculation of PPS=(V17e+V17f+V17i+V17j)−(V17g+V17h+V17k+V17l). A track error signal by means of a differential push-pull method is obtained from a calculation of TE=PPM−α*PPS (α is a constant). A lens position signal is obtained from a calculation of LP=PPM+β*PPS (β is a constant). Further, an RF signal is obtained from a calculation of RF=V17a+V17b+V17c+V17d.

FIG. 4 shows phases of a sub-beam reflected from the disk 7 and of sub-beams diffracted from the disk 7 in a case of using a disk of groove recording system with a narrow pitch of grove as the disk 7. It is assumed that focused spots, which are sub-beams, are located at the center of the track of the disk 7. Areas 24a and 24b correspond to diffracted lights, diffracted from the areas 15a and 15b of the diffractive optical element 3e respectively, of the sub-beam reflected from the disk 7 as the 0th-order light. Areas 25a and 25b correspond to diffracted lights, diffracted from the areas 15a and 15b of the diffractive optical element 3e respectively, of the sub-beam diffracted from the disk 7 as the +1st-order diffraction light. Areas 26a and 26b correspond to diffracted lights, diffracted from the areas 15a and 15b of the diffractive optical element 3e respectively, of the sub-beam diffracted from the disk 7 as the −1st-order diffracted light. In an area indicated as + and an area indicated as −, phases of the lights are shifted by π to each other. Note that dotted lines shown in FIG. 4 indicate the effective diameter of the optical lens 6.

In FIG. 4, R indicates an effective radius of the objective lens 6, and D1 indicates a distance between the centers of the sub-beam reflected from the disk 7 and of the sub-beam diffracted from the disk 7 on the pupil face of the objective lens 6. Assuming that the wavelength of the semiconductor laser 1 is λ, the focal length of the objective lens 6 is f, the numerical aperture in the objective lens 6 is NA, the pitch of a grove in the disk 7 of groove recording system is Tp1, R=f*NA and D1=f*λ/Tp1 are established. Here, assuming that λ=405 nm, f=3.05 mm, NA=0.65 and Tp1=0.4 μm, the following results are obtained: R=1.98 mm and D1=3.09 mm.

FIG. 5 shows phases of a sub-beam reflected from the disk 7 and of sub-beams diffracted from the disk 7 in a case of using a disk of land/groove recording system with a wide pitch of groove as the disk 7. It is assumed that focused spots, which are sub-beams, are located at the center of the track of the disk 7. Areas 24a and 24b correspond to diffracted lights, diffracted from the areas 15a and 15b of the diffractive optical element 3e respectively, of the sub-beam reflected from the disk 7 as the 0th-order light. Areas 25a and 25b correspond to diffracted lights, diffracted from the areas 15a and 15b of the diffractive optical element 3e respectively, of the sub-beam diffracted from the disk 7 as the +1st-order diffracted light. Areas 26a and 26b correspond to diffracted lights, diffracted from the areas 15a and 15b of the diffractive optical element 3e respectively, of the sub-beam diffracted from the disk 7 as the −1st-order diffracted light. In an area indicated as + and an area indicated as −, the phases of lights are shifted by π to each other. Note that dotted lines shown in FIG. 4 indicate the effective diameter of the optical lens 6.

In FIG. 5, R indicates the effective radius of the objective lens 6, and D2 indicates a distance between the centers of the sub-beam reflected from the disk 7 and of the sub-beam diffracted from the disk 7 on the pupil face of the objective lens 6. Assuming that the wavelength of the semiconductor laser 1 is λ, the focal length of the objective lens 6 is f, the numerical aperture in the objective lens 6 is NA, the pitch of a groove in the disk 7 of land/groove recording system is Tp2, R=f*NA and D2=f*λ/Tp2 are established. Here, assuming that λ=405 nm, f=3.05 mm, NA=0.65 and Tp2=0.68 μm, the following results are obtained: R=1.98 mm and D2=1.82 mm.

A push-pull signal is detected by using the fact that a light reflected from the disk 7 and the light diffracted from the disk 7 are interfered with each other at a part where both are overlapped, and the intensities of the lights interfered are changed by respective phases. In the part where the sub-beam reflected from the disk 7 and the sub-beam diffracted from the disk 7 are overlapped, if the phases of the both beams are shifted by π to each other, a push-pull signal of the sub-beam has the inverse polarity to a push-pull signal of the main beam. In contrast, if the phases of the both sub-beams coincide with each other, a push-pull signal of the sub-beam has the polarity the same as that of a push-pull signal of the main beam.

FIGS. 6(a) and 6(b) show calculation examples of the relationships between the off-track amount and push-pull signals in the case of using a disk of groove recording system with a narrow pitch as the disk 7. As conditions of calculation, the groove depth of the disk 7 is set to 0.1 λ, in addition to the conditions described in FIG. 4. FIG. 6(a) shows the relationship between the off-track amount and a push-pull signal of the main beam, and FIG. 6(b) shows the relationship between the off-track amount and a push-pull signal of the sub-beam. Further, white circles show the calculation results in a case of the lens shift amount being 0 μm, gray circles show the calculation results in a case of the lens shift amount being 100 μm, and black circles show the calculation results in a case of the lens shift amount being 200 μm. The horizontal axes of the Figures are standardized by the pitch of a groove of the disk 7, and the vertical axes thereof are standardized by the level of a sum signal in the case where there is no groove in the disk 7.

In FIG. 4, the area 24a of the 0th-order light and the area 25b of the +1st-order diffracted light are overlapped, and the area 24b of the 0th-order light and the area 26a of the −1st-order diffracted light are overlapped. In the area 24a and the area 25b, phases of the lights are shifted by π to each other, and in the area 24b and the area 26a, phases of the lights are shifted by π to each other. Therefore, a push-pull signal of the sub-beam has the inverse polarity to that of a push-pull signal of the main beam.

If there is a lens shift, the boundary between the area 24a and the area 24b, the boundary between the area 25a and the area 25b, and the boundary between the area 26a and the area 26b are shifted to the left side or the right side of FIG. 4 according to the direction of the lens shift. However, assuming that the maximum value of the lens shift amount is 200 μm, the width of the part where the area 24a of the 0th-order light and the area 25b of the +1st-order diffracted light are overlapped remains unchanged, and the width of the part where the area 24b of the 0th-order light and the area 26a of the −1st-order diffracted light are overlapped remains unchanged.

Due to the reasons described above, a push-pull signal of the sub-beam has the inverse polarity to that of a push-pull signal of the main beam, which is obvious by comparing FIG. 6(a) with FIG. 6(b). Further, the amplitude of a push-pull signal of the sub-beam is the same as that of a push-pull signal of the main beam, not depending on the amount of lens shift.

On the other hand, in either FIG. 6(a) or FIG. 6(b), offsets of the same sign are generated in push-pull signals if there is a lens shift, and the offset amount increases as the lens shift amount increases. Although the sign of the offset is negative here, the sign of the offset is changed to positive if the direction of the lens shift is reversed.

FIGS. 7(a) and 7(b) show calculation examples of the relationships between the off-track amount and a tracking error signal and between the off-track amount and a lens position signal in the case of using a disk of groove recording system with a narrow pitch of groove as the disk 7. The conditions of calculation are the same as those described for FIGS. 6(a) and 6(b). FIG. 7(a) shows the relationship between the off-track amount and a track error signal by means of a differential push-pull method, and FIG. 7(b) shows the relationship between the off-tack amount and a lens position signal. Further, white circles indicate calculation results in the case of the lens shift amount being 0 μm, gray circles indicate calculation results in the case of the lens shift amount being 100 μm, and black circles indicate calculation results in the case of the lens shift amount being 200 μm.

The horizontal axes in the Figures are standardized by the pitch of a groove of the disk 7. Assuming that sum signals of the main beams and the sub-beams are SUMM and SUMS, respectively, the vertical axes of FIGS. 6(a) and 6(b) are given by PPM/SUMM and PPS/SUMS, respectively. Here, assuming that α=β=SUMM/SUMS, the vertical axis of FIG. 7(a) is (PPM/SUMM−PPS/SUMS)/2=TE/(SUMM+α*SUMS), and the vertical axis of FIG. 7(b) is (PPM/SUMM+PPS/SUMS)/2=LP/(SUMM+β*SUMS). That is, the vertical axis of FIG. 7(a) is standardized by SUMM+α*SUMS, and the vertical axis of FIG. 7(b) is standardized by SUMM+β*SUMS.

In FIG. 7(a), an offset of a push-pull signal due to a lens shift is canceled by obtaining the difference between a push-pull signal of the main beam and a push-pull signal of the sub-beam, whereby a fine track error signal not causing an offset is obtained even though there is a lens shift. Further, the amplitude of the track error signal is constant, not depending on the lens shift amount.

On the other hand, in FIG. 7(b), a component (groove crossing noise) which varies depending on the off-track amount is canceled by obtaining the sum of a push-pull signal of the main beam and a push-pull signal of the sub-beam, not depending on the lens shift amount, so that a fine lens position signal without a groove crossing noise is obtained.

FIGS. 8(a) and 8(b) show calculation examples of the relationships between the off-track amount and push-pull signals in the case of using a disk of land/groove recording system with a wide pitch of groove as the disk 7. As the calculation conditions, the groove depth of the disk 7 is set to 0.18 λ, in addition to the conditions described for FIG. 5. FIG. 8(a) shows the relationship between the off-track amount and a push-pull signal of the main beam, and FIG. 8(b) shows the relationship between the off-track amount and a push-pull signal of the sub-beam. Further, white circles show the calculation results in the case of the lens shift amount being 0 μm, gray circles show the calculation results in the case of the lens shift amount being 100 μm, and black circles show the calculation results in the case of the lens shift amount being 200 μm. The horizontal axes of the Figures are standardized by the pitch of a groove of the disk 7, and the vertical axes thereof are standardized by the level of a sum signal in the case where there is no groove in the disk 7.

In FIG. 5, the area 24a of the 0th-order light and the area 25b of the +1st-order diffracted light are almost overlapped, and the area 24b of the 0th-order light and the area 26a of the −1st-order diffracted light are almost overlapped. In the area 24a and the area 25b, phases of the lights are shifted by π to each other, and in the area 24b and the area 26a, phases of the lights are shifted by π to each other. Therefore, a push-pull signal of the sub-beam obtained in this area has the inverse polarity to that of a push-pull signal of the main beam. However, in FIG. 5, the area 24a of the 0th-order light and the area 25a of the +1st-order diffracted light, and the area 24b of the 0th-order light and the area 25b of the +1st-order diffracted light are also overlapped partially, respectively, and the area 24b of the 0th-order light and the area 26b of the −1st-order diffracted light, and the area 24a of the 0th-order light and the area 26a of the 1st-order diffracted light are also overlapped partially, respectively. In the area 24a and the area 25a, and in the area 24b and the area 25b, phases of the lights coincide, and further, in the area 24b and the area 26b, and in the area 24a and the area 26a, phases of the lights coincide. Therefore, push-pull signals of the sub-beams, obtained from these parts, have the same polarity to that of a push-pull signal of the main beam.

When there is a lens shift, the boundary between the area 24a and the area 24b, the boundary between the area 25a and the area 25b, and the boundary between the area 26a and the area 26b are shifted to the left side or the right side in FIG. 5 according to the direction of the lens shift. If these boundaries are shifted to the left side in FIG. 5, the width of the part where the area 24a of the 0th-order light and the area 25b of the +1st-order diffracted light are overlapped becomes narrower, and also the width of the part where the area 24b of the 0th-order light and the area 26a of the −1st-order diffracted light are overlapped becomes narrower. In contrast, the width of the part where the area 24b of the 0th-order light and the area 25b of the +1st-order diffracted light are overlapped becomes wider, and also the width of the part where the area 24b of the 0th-order light and the area 26b of the −1st-order diffracted light are overlapped becomes wider.

Due to the reasons described above, a push-pull signal of the sub-beam has the inverse polarity to that of the push-pull signal of the main beam, which is obvious by comparing FIG. 8(a) with FIG. 8(b). However, the amplitude of a push-pull signal of the sub-beam is smaller than that of a push-pull signal of the main beam, and as the lens-shift amount increases, the difference between the amplitude of a push-pull signal of the sub-beam and that of a push-pull signal of the main beam increases.

On the other hand, in either FIG. 8(a) or FIG. 8(b), offsets of the same sign are generated in push-pull signals if there is a lens shift, and the offset amount increases as the lens shift amount increases. Although the sign of the offset is negative here, the sign of the offset is changed to positive if the direction of the lens shift is reversed.

FIGS. 9(a) and 9(b) show calculation examples of the relationships between the off-track amount and a track error signal and between the off-track amount and a lens position signal in the case of using a disk of land/groove recording system with a wide pitch of groove as the disk 7. The conditions of calculation are the same as those described for FIGS. 8(a) and 8(b). FIG. 9(a) shows the relationship between the off-track amount and a track error signal by means of a differential push-pull method, and FIG. 9(b) shows the relationship between the off-tack amount and a lens position signal. Further, white circles indicate calculation results in the case of the lens shift amount being 0 μm, gray circles indicate calculation results in the case of the lens shift amount being 100 μm, and black circles indicate calculation results in the case of the lens shift amount being 200 μm.

The horizontal axes in the Figures are standardized by the pitch of a groove of the disk 7. Assuming that sum signals of the main beams and the sub-beams are SUMM and SUMS, respectively, and the vertical axes of FIGS. 8(a) and 8(b) are given by PPM/SUMM and PPS/SUMS. Here, assuming that α=β=SUMM/SUMS, the vertical axis of FIG. 9(a) is (PPM/SUMM−PPS/SUMS)/2=TE/(SUMM+α*SUMS), and the vertical axis of FIG. 9(b) is (PPM/SUMM+PPS/SUMS)/2=LP/(SUMM+β*SUMS). That is, the vertical axis of FIG. 9(a) is standardized by SUMM+α*SUMS, and the vertical axis of FIG. 9(b) is standardized by SUMM+β*SUMS.

In FIG. 9(a), an offset of a push-pull signal due to a lens shift is canceled mostly by taking the difference between a push-pull signal of the main beam and a push-pull signal of the sub-beam, whereby a fine track error signal causing little offset is obtained even though there is a lens shift. However, if there is a lens shift, the amplitude of the track error signal is reduced. Therefore, as the lens shift amount increases, the reduced amount of the amplitude also increases.

On the other hand, in FIG. 9(b), if there is no lens shift, a component (groove crossing noise) which varies depending on the off-track amount is canceled by obtaining the sum of a push-pull signal of the main beam and a push-pull signal of the sub-beam, so that a fine lens position signal without a groove crossing noise is obtained. However, if there is a lens shift, the groove crossing noise is not canceled completely and remains even when the sum of the push-pull signal of the main beam and the push-pull signal of the sub-beam is taken. Therefore, as the lens shift amount increases, the amplitude of the remaining groove crossing noise also increases. The ratio of the amplitude of the groove crossing noise to a DC component of the lens position signal is about 1.77, which is large.

As described above, in the optical head device according to Patent Document 1, it is possible to obtain a fine track error signal and a fine lens position signal even though there is a lens shift with respect to an optical recording device of a groove recording system with a narrow pitch of groove. However, with respect to an optical recording device of a land/groove recording system with a wide pitch of groove, the amplitude of a track error signal decreases, and a groove crossing noise remains in a lens position signal if there is a lens shift.

SUMMARY OF THE INVENTION

It is therefore an object of the invention to solve the problems in conventional optical head devices described above, and to provide an optical head device and an optical information recording or reproducing devices capable of obtaining fine track error signals and lens position signals even though there are lens shifts, with respect to plural types of optical recording medium with different pitches of grooves.

An optical head device according to the present invention comprises: a light source; a diffractive optical element for dividing a light emitted from the light source into a main beam and at least one sub-beam in an outward path; an objective lens for focusing the main beam and the sub-beam, divided by the diffractive optical element in the outward path, on a disk-shaped optical recording medium with spiral tracks; and a photodetector for receiving the main beam and the sub-beam reflected from the optical recording medium in an inward path. At least a part of the diffractive optical element includes a diffraction grating divided into four or more plural areas by three or more plural lines in parallel with a direction corresponding to a tangential direction of the optical recording medium, and in two adjacent areas among the plural areas, phases of gratings are shifted by π to each other. The focused light spots of the main beam and the sub-beam may be located on the same track of the optical recording medium. Further, the diffraction grating divided into a plurality of areas may be formed all over the diffractive optical element.

The photodetector may be configured so as to detect a push-pull signal from each of the main beam and the sub-beam. The difference between the push-pull signal of the main beam and the push-pull signal of the sub-beam may be defined as a track error signal, and the sum thereof may be defined as a lens position signal.

The diffractive optical element may have a diffraction grating divided into eight areas, which are first to eighth areas from one end to another end, by a line passing through the optical axis of an incident light and in parallel with the direction corresponding to the tangential direction of the optical recording medium and by six lines symmetrical with respect to the optical axis of the incident light and in parallel with the direction corresponding to the tangential direction of the optical recording medium. Phases of lattices in the first, third, fifth and seventh areas and phases of lattices in the second, fourth, sixth and eighth areas are shifted by π to each other. Further, the optical head device may be so configured that assuming: a distance from the optical axis of the incident light to the boundary between the third area and the fourth area, and a distance from the optical axis of the incident light to the boundary between the fifth area and the sixth area are L1, respectively; a distance from the optical axis of the incident light to the boundary between the second area and the third area, and a distance from the optical axis of the incident light to the boundary between the sixth area and the seventh area are L2, respectively; a distance from the optical axis of the incident light to the boundary between the first area and the second area, and a distance from the optical axis of the incident light to the boundary between the seventh area and the eighth area are L3, respectively; and the wavelength of the light source is λ, the focal length of the objective lens is f, the pitch of a groove of the optical recording medium of a first kind is Tp1, and the pitch of a groove of the optical recording medium of a second kind is Tp2 (where Tp1<Tp2), following equations are established: $L1=f*\lambda*(2/Tp2-1/Tp1)$, $L2=f*\lambda*(1/Tp1-1/Tp2)$, and $L3=f*\lambda/Tp2$.

The diffractive optical element may have a diffraction grating divided into seven areas, which are first to seventh areas from one end to another end, by six lines symmetrical with respect to the optical axis of the incident light and in parallel with the direction corresponding to the tangential direction of the optical recording medium. Here, phases of lattices in the first, third, fifth and seventh areas and phases of lattices in the second, fourth, and sixth areas are shifted by $\pi$ to each other. Further, the optical head device may be so configured that assuming: a distance from the optical axis of the incident light to the boundary between the third area and the fourth area, and a distance from the optical axis of the incident light to the boundary between the fourth area and the fifth area are $L1$, respectively; a distance from the optical axis of the incident light to the boundary between the second area and the third area, and a distance from the optical axis of the incident light to the boundary between the fifth area and the sixth area are $L2$, respectively; a distance from the optical axis of the incident light to the boundary between the first area and the second area, and a distance from the optical axis of the incident light to the boundary between the sixth area and the seven area are $L3$, respectively; and the wavelength of the light source is $\lambda$, the focal length of the objective lens is f, the pitch of a groove of the optical recording medium of a first kind is $Tp1$, and the pitch of a groove of the optical recording medium of a second kind is $Tp2$ (where $Tp1<Tp2$), following equations are established: $L1=f*\lambda*(1/Tp2-1/2Tp1)$, $L2=f*\lambda/2Tp2$, and $L3=f*\lambda/2Tp1$.

The diffractive optical element may be composed of a first part and a second part, and may have such a configuration that the first part is provided with a diffraction grating formed of a signal area, the second part is provided with a diffraction grating divided into a plurality of areas by lines in parallel with the direction corresponding to the tangential direction of the optical recording medium, and in two adjacent areas among the plurality of areas, phases of lattices are shifted by $\pi$ to each other. The second part may be applied with the configuration described above.

An optical information recording or reproducing device according to the present invention comprises: the optical head device of the present invention; a first circuit for driving the light source; a second circuit for generating a reproduction signal and an error signal based on an output signal of the photodetector; and a third circuit for controlling the position of the objective lens based on the error signal. Here, the first circuit may drive the light source based on a recording signal, or drive the light source with a constant output.

Further, the optical head device of the present invention includes: a light source; a diffractive optical element for dividing a light emitted from the light source into a main beam and at least one sub-beam; an objective lens for focusing the main beam and the sub-beam, divided by the diffractive optical element, on an optical recording medium; and a photodetector for receiving the main beam and the sub-beam reflected from the optical recording medium, and is characterized in that at least a part of the diffractive optical element includes a diffraction grating divided into a plurality of areas by a plurality of lines in parallel with the direction corresponding to the tangential direction of the optical recording medium, and that in two adjacent areas among the plurality of areas, phases of lattices are shifted by $\pi$ to each other.

Further, the optical information recording or reproducing device of the present invention is characterized as to include: the optical head device of the present invention; a first circuit for driving the light source; a second circuit for generating a reproduction signal and an error signal based on an output signal of the photodetector; and a third circuit for controlling the position of the objective lens based on the error signal.

In the optical head device and the optical information recording or reproducing device of the present invention, in a part where the sub-beam reflected from an optical recording medium and the sub-beam diffracted from the optical recording medium are overlapped, the phases of the both are shifted by $\pi$ to each other with respect to any one of optical recording medium of plural types, not depending on the lens shift amount.

Therefore, a push-pull signal of the sub-beams has the inverse polarity to that of a push-pull signal of the main beam. Further, the amplitude of a push-pull signal of the sub-beam is the same as that of a push-pull signal of the main beam, not depending on the lens shift amount. If there is a lens shift, offsets of the same sign are generated in a push-pull signal of the main beam and in a push-pull signal of the sub-beam. As the lens shift amount increases, the offset amount also increases.

In view of the above, an offset of a push-pull signal due to a lens shift is canceled by taking the difference between a push-pull signal of the main beam and a push-pull signal of the sub-beam, whereby a fine track error signal not causing an offset even though there is a lens shift is obtained. Further, the amplitude of a track error signal is constant, not depending on the lens shift amount. Moreover, a component (groove crossing noise) which varies depending on the off-track amount is canceled by taking the sum of a push-pull signal of the main beam and a push-pull signal of the sub-beam, not depending on the lens shift amount, whereby a fine lens position signal without a groove crossing noise is obtained.

(Effect of the Invention)

As described above, an effect of the optical head device and the optical information recording or reproducing device according to the present invention is to obtain a fine track error signal and a fine lens position signal even though there is a lens shift, with respect to plural types of optical recording medium with different pitches of grooves. This is due to the fact that in a part where a sub-beam reflected from an optical recording medium and a sub-beam diffracted from the optical recording medium are overlapped, the phases of the both are shifted by $\pi$ to each other, not depending on the lens shift amount, with respect to any one of plural types of optical recording medium.

BRIEF DESCRIPTION OF THE DRAWINGS

FIG. 4 is a diagram showing phases of a sub-beam reflected from a disk and of sub-beams diffracted from the disk, relating to a disk of groove recording system with a narrow pitch of groove, in the conventional optical head device;

FIG. 5 is a diagram showing phases of a sub-beam reflected from a disk and of sub-beams diffracted from the disk, relating to a disk of land/groove recording system with a wide pitch of groove, in the conventional optical head device;

FIGS. 6(a) and 6(b) are charts of calculation examples showing the relationships between the off-track amount and push-pull signals, relating to a disk of the groove recording system with a narrow pitch of groove, in the conventional optical head device;

FIGS. 7(a) and 7(b) are charts of calculation examples showing the relationships between the off-track amount and a tracking error signal and between the off-track amount and a lens position signal, relating to a disk of the groove recording system with a narrow pitch of groove, in the conventional optical head device;

FIGS. 8(a) and 8(b) are charts of calculation examples showing the relationships between the off-track amount and push-pull signals, relating to a disk of the land/groove recording system with a wide pitch of groove, in the conventional optical head device;

FIGS. 9(a) and 9(b) are charts of calculation examples showing the relationships between the off-track amount and a tracking error signal and between the off-track amount and a lens position signal, relating to a disk of the land/groove recording system with a wide pitch of groove, in the conventional optical head device;

FIG. 12 is a diagram showing phases of a sub-beam reflected from a disk and of sub-beams diffracted from the disk, relating to a disk of the land/groove recording system with a wide pitch of groove, in the first embodiment;

FIGS. 13(a) and 13(b) are charts of calculation examples showing the relationships between the off-track amount and push-pull signals, relating to a disk of the groove recording system with a narrow pitch of the groove, in the first embodiment;

FIGS. 14(a) and 14(b) are charts of calculation examples showing the relationships between the off-track amount and a tracking error signal and between the off-track amount and a lens position signal relating to a disk of the groove recording system with a narrow pitch of groove, in the first embodiment;

FIGS. 15(a) and 15(b) are charts of calculation examples showing the relationships between the off-track amount and push-pull signals, relating to a disk of the land/groove recording system with a wide pitch of groove, in the first embodiment;

FIGS. 16(a) and 16(b) are charts of calculation examples showing the relationships between the off-track amount and a tracking error signal and between the off-track amount and a lens position signal relating to a disk of the land/groove recording system with a wide pitch of groove in the first embodiment;

FIG. 19 is a diagram showing phases of a sub-beam reflected from a disk and of sub-beams diffracted from the disk, relating to a disk of the land/groove recording system with a wide pitch of groove;

PREFERRED EMBODIMENTS OF THE INVENTION

Embodiments of the present invention will be explained below with reference to the drawings.

Figure 1:
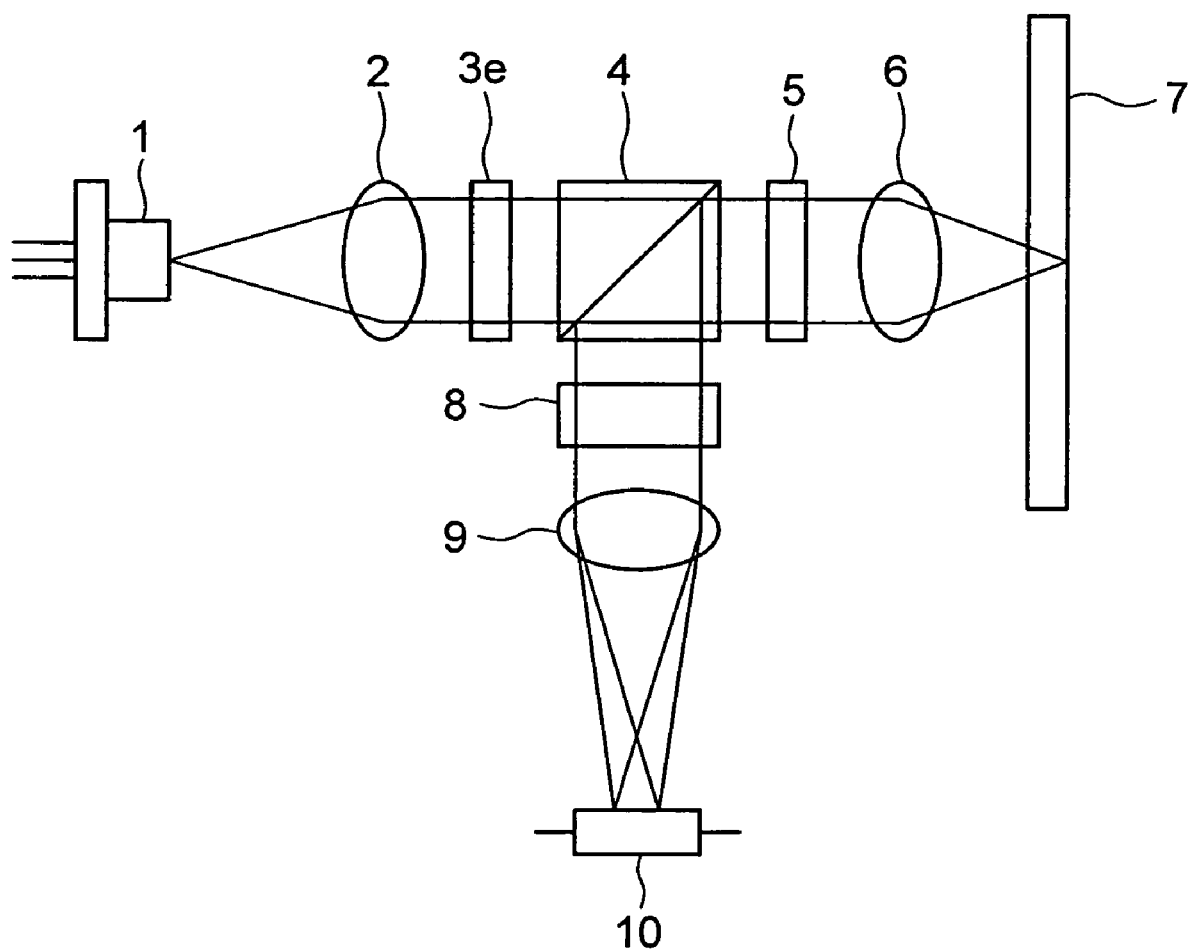
FIG. 1 is a diagram showing the configuration of a conventional optical head device.
Figure 2:
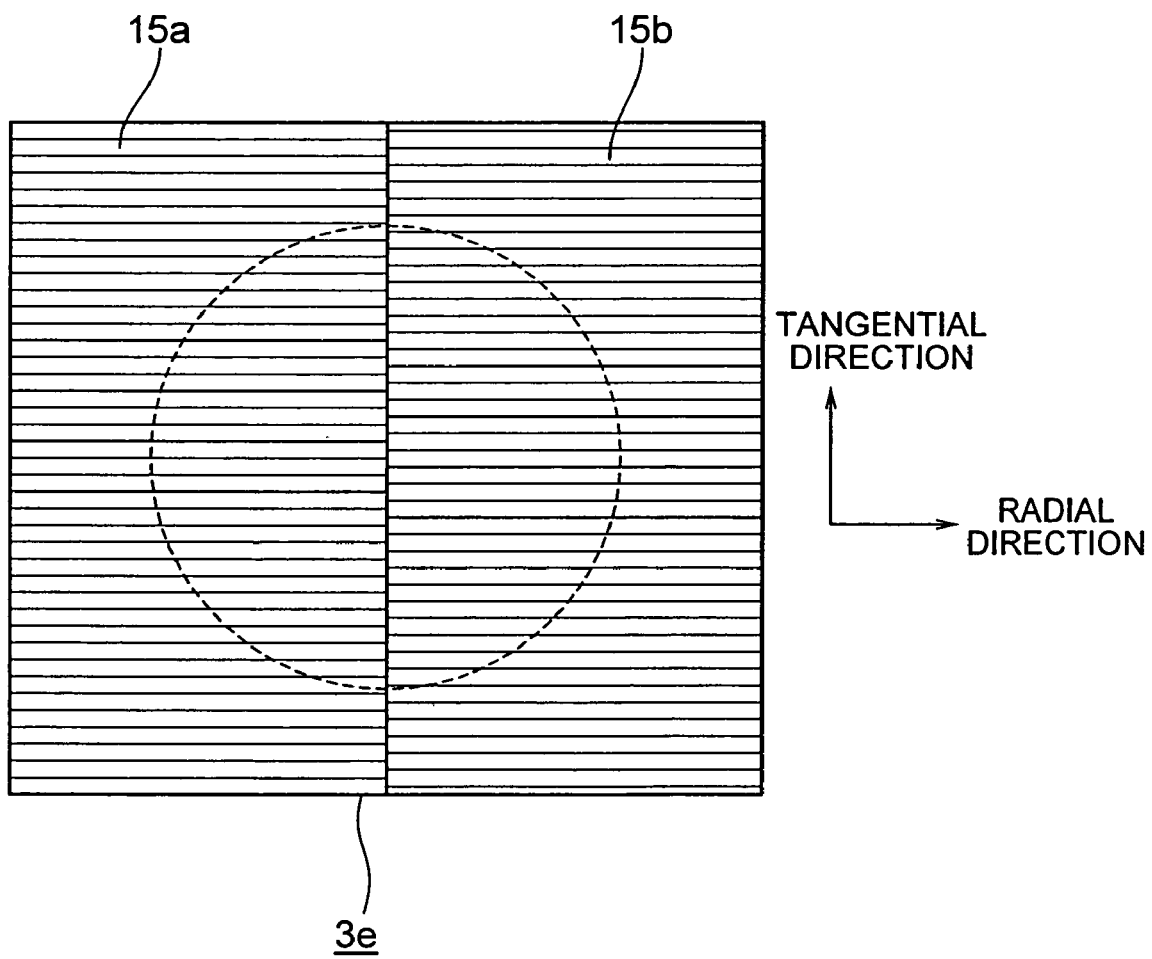
FIG. 2 is a plan view showing a diffractive optical element of the conventional optical head device.

A first embodiment of an optical head device according to the present invention is one in which the diffractive optical element $3e$ in the optical head device shown in FIG. 1 is replaced with a diffractive optical element $3a$.

Figure 10:
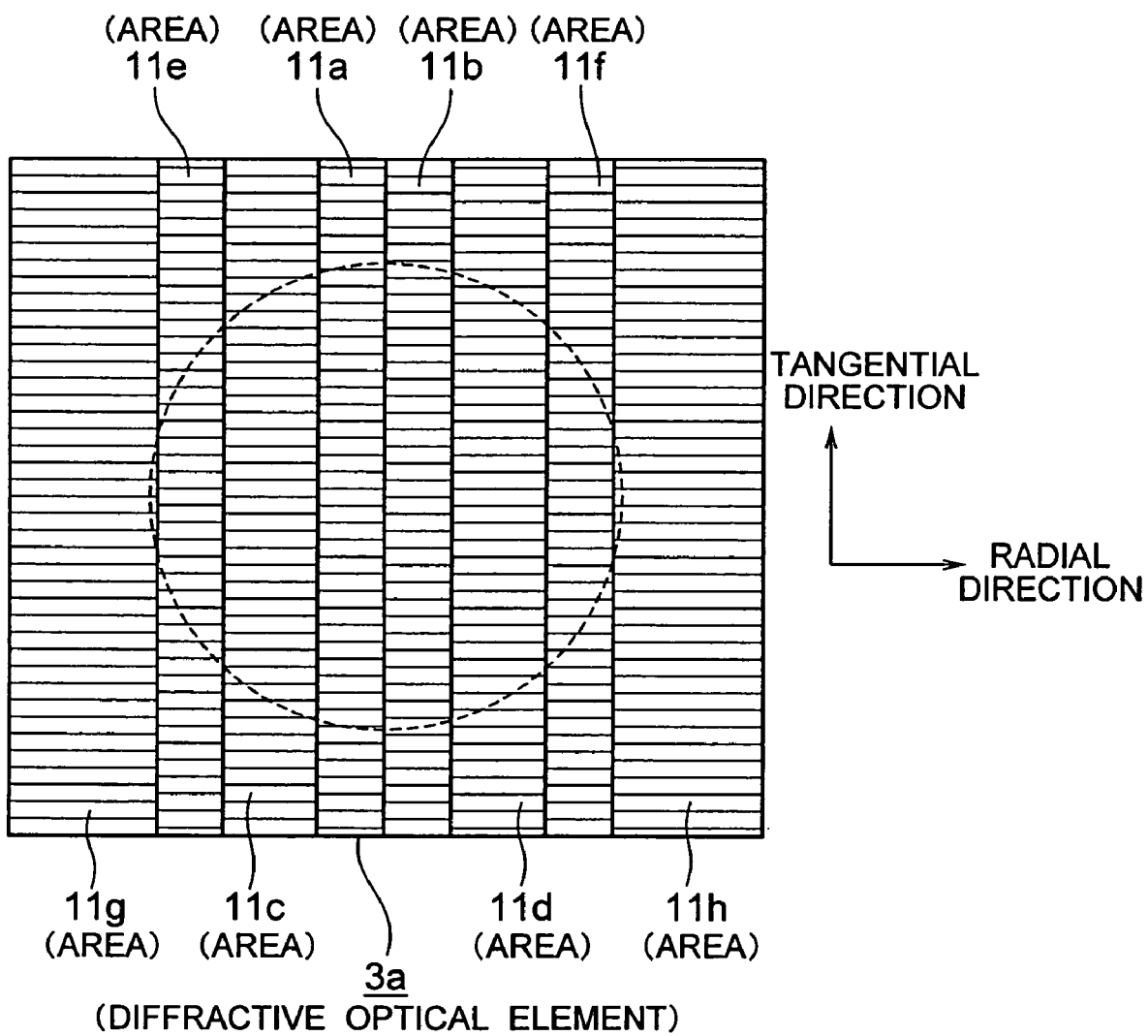
FIG. 10 is a plan view showing a diffractive optical element in a first embodiment of an optical head device of the present invention.

FIG. 10 is a plan view of the diffractive optical element $3a$. The diffractive optical element $3a$ is so configured to include a diffraction grating divided into eight areas $11a$ to $11h$ by a line passing through the optical axis of an incident light and in parallel with the direction corresponding to the tangential direction of the disk 7, and by six lines symmetrical to the optical axis of the incident light and in parallel with the direction corresponding to the tangential direction of the disk 7. The directions of the lattices in the diffraction gratings are in parallel with the direction corresponding to the radial direction of the disk 7 and its pattern is in a linear form at even intervals. In the areas $11a$ to $11h$, all intervals of the lattices are equal. Phases of the lattices in the areas $11a$, $11d$, $11e$ and $11h$ and phases of the lattices in the areas $11b$, $11c$, $11f$ and $11g$ are shifted by $\pi$ to each other. For example, if the lattice consists of a recessing and projecting structure, recessed parts and projected parts are formed alternatively. In FIG. 10, the dotted line shows the effective diameter of the objective lens 6. In FIG. 10, one cycle of the recessing and projecting structure of the lattice is shown with one line. However, since the line only shows the lattice conceptually, the number of lines does not coincides with the actual number of lattices or the like.

Now, it is assumed that the wavelength of the semiconductor laser 1 is $\lambda$, the refractive index of the lattice is n, the height of the lattice is h, and h=$0.115\lambda/(n-1)$. Here, the transmission factor of the lattice is about 87.5%, and the ±1st-order diffraction efficiency is about 5.1%, respectively. That is, as for the light made incident on the areas $11a$ to $11h$, about 87.5% thereof transmits through as the 0th-order light, and about 5.1% thereof is diffracted as each of the ±1st-order diffracted lights. Phases of the +1st-order diffracted lights from the areas $11a$, $11d$, $11e$ and $11h$ and phases of the +1st-order diffracted lights from the areas $11b$, $11c$, $11f$ and $11g$ are shifted by $\pi$ to each other. Similarly, phases of the −1st-order diffracted lights from the areas $11a$, $11d$, $11e$ and $11h$ and the phases of the −1st-order diffracted lights from the areas $11b$, $11c$, $11f$ and $11g$ are shifted by $\pi$ to each other.

On the disk 7, there are formed three focused spots corresponding to the 0th-order light, the +1st-order diffracted light and the −1st-order diffracted light from the diffracted optical element $3a$. The three focused spots are located on the same track on the disk 7.

Figure 3:
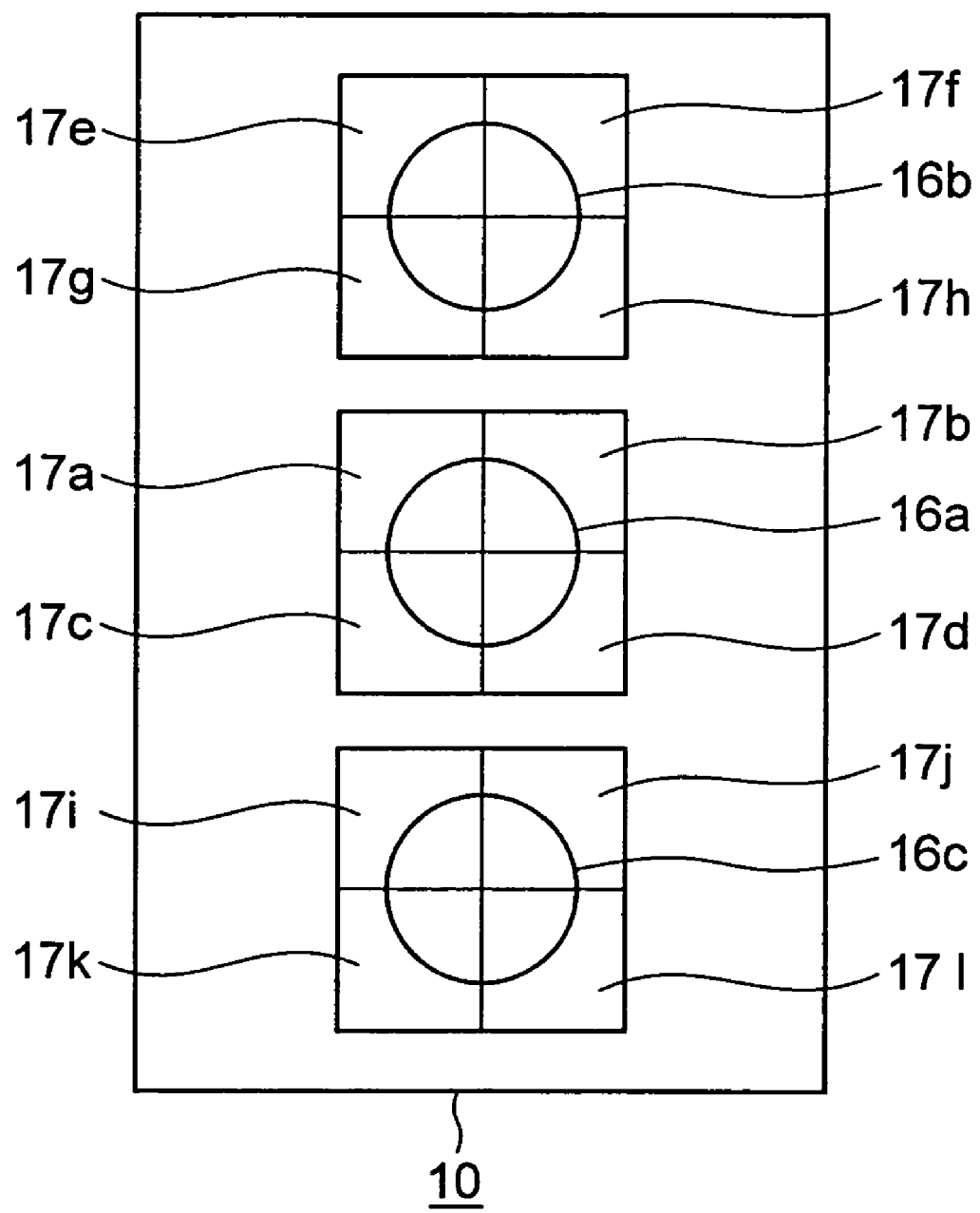
FIG. 3 is a diagram showing patterns of light receiving parts of an photodetector and an arrangement of light spots on the photodetector in the conventional optical head device.

The patterns of the light receiving sections of the photodetector 10 and the arrangement of the light spots on the photodetector 10 in the present embodiment are the same as those shown in FIG. 3. In the present embodiment, focus error signals, push-pull signals of the main beam, push-pull signals of the sub-beam, track error signals of the differential push-pull system, lens position signals and RF signals are obtained by means of a method the same as that described for the optical head device shown in FIG. 1.

Figure 11:
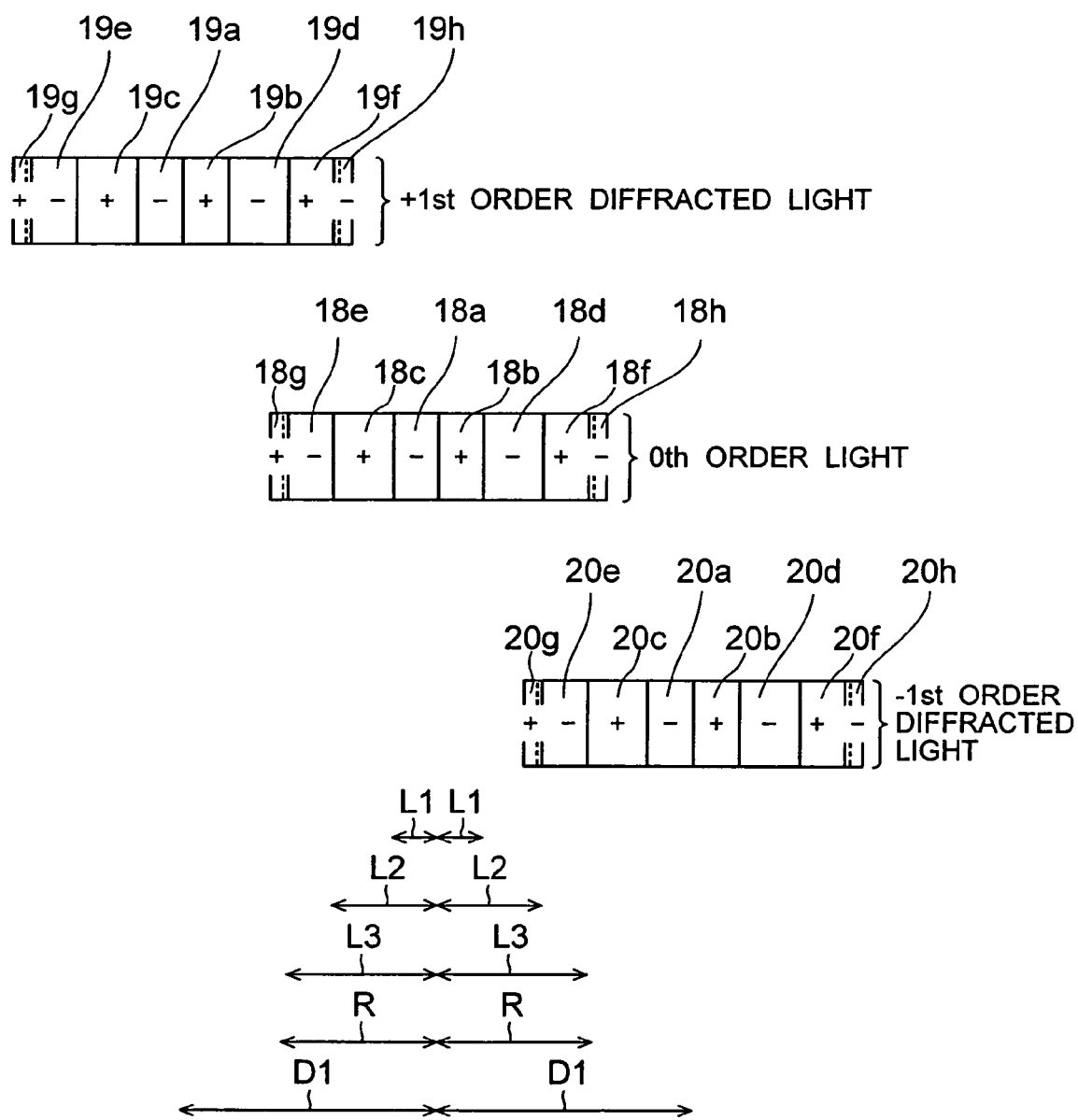
FIG. 11 is a diagram showing phases of a sub-beam reflected from a disk and of sub-beams diffracted from the disk, relating to a disk of the groove recording system with a narrow pitch of groove in the first embodiment.

FIG. 11 shows phases of a sub-beam reflected from the disk 7 and of sub-beams diffracted from the disk 7 in the case of using a disk of groove recording system with a narrow pitch of groove as the disk 7. It is assumed that focused spots, which are sub-beams, are located at the center of the track of the disk 7. Areas 18a to 18h correspond to diffracted lights, diffracted from the areas 11a to 11h of the diffractive optical element 3a respectively, of the sub-beam reflected from the disk 7 as the 0th-order light. Areas 19a to 19h correspond to diffracted lights, diffracted from the areas 11a to 11h of the diffractive optical element 3a respectively, of the sub-beam diffracted from the disk 7 as +1st-order diffracted light. Areas 20a to 20h correspond to diffracted lights, diffracted from the areas 11a to 11h of the diffractive optical element 3a respectively, of the sub-beam diffracted from the disk 7 as the −1st-order diffracted light. In an area indicated as + and an area indicated as −, phases of the lights are shifted by $\pi$ to each other. Note that dotted lines shown in FIG. 11 indicate the effective diameter of the objective lens 6.

In FIG. 11, R indicates an effective radius of the objective lens 6, D1 indicates a distance between the centers of the sub-beam reflected from the disk 7 and the sub-beam diffracted from the disk 7 on the pupil face of the objective lens 6, L1 indicates a distance from the optical axis (boundary between the area 11a and the area 11b) of the diffractive optical element 3a to the boundary between the area 11c and the area 11a and a distance from the optical axis of the diffractive optical element 3a to the boundary between the area 11b and the area 11d, L2 indicates a distance from the optical axis (boundary between the area 11a and the area 11b) of the diffractive optical element 3a to the boundary between the area 11e and the area 11c and a distance from the optical axis of the diffractive optical element 3a to the boundary between the area 11d and the area 11f, and L3 indicates a distance from the optical axis (boundary between the area 11a and the area 11b) of the diffractive optical element 3a to the boundary between the area 11g and the area 11e, and a distance from the optical axis of the diffractive optical element 3a to the boundary between the area 11f and the area 11h.

Assuming that the wavelength of the semiconductor laser 1 is $\lambda$, the focal length of the objective lens 6 is f, the numerical aperture in the objective lens 6 is NA, the pitch of a groove in the disk 7 of the groove recording system is Tp1, and the pitch of a groove in the disk 7 of the land/groove recording system is Tp2, R=f*NA and D1=f*$\lambda$/Tp1 are established. Further, L1=f*$\lambda$*(2/Tp2−1/Tp1), L2=f*$\lambda$*(1/Tp1−1/Tp2), and L3=f*$\lambda$/Tp2 are also established. Here, assuming that $\lambda$=405 nm, f=3.05 mm, NA=0.65, Tp1=0.4 µm, and Tp2=0.68 µm, the following results are obtained: R=1.98 mm, D1=3.09 mm, L1=0.55 mm, L2=1.27 mm, L3=1.82 mm. Note that when a lens system is inserted in between the diffractive optical element 3a and the objective lens 6, values of L1 to L3 on the diffractive optical element 3a are corrected, with respect to the values of L1 to L3 described above, according to the multiplying factor of the lens system.

FIG. 12 shows phases of a sub-beam reflected from the disk 7 and of sub-beams diffracted from the disk 7 in the case of using a disk of land/groove recording system with a wide pitch of groove as the disk 7. It is assumed that focused spots, which are sub-beams, are located at the center of the track of the disk 7. Areas 18a to 18h correspond to diffracted lights, diffracted from the areas 11a to 11h of the diffractive optical element 3a respectively, of the sub-beam reflected from the disk 7 as the 0th-order light. Areas 19a to 19h correspond to diffracted lights, diffracted from the areas 11a to 11h of the diffractive optical element 3a respectively, of the sub-beam diffracted from the disk 7 as the +1st-order diffracted light. Areas 20a to 20h correspond to diffracted lights, diffracted from the areas 11a to 11h of the diffractive optical element 3a respectively, of the sub-beam diffracted from the disk 7 as the −1st-order diffracted light. In an area indicated as + and an area indicated as −, phases of the lights are shifted by $\pi$ to each other. Note that dotted lines shown in FIG. 4 indicate the effective diameter of the objective lens 6.

In FIG. 12, R indicates an effective radius of the objective lens 6, D2 indicates a distance between the centers of the sub-beam reflected from the disk 7 and the sub-beam diffracted from the disk 7 on the pupil face of the objective lens 6, L1 indicates a distance from the optical axis (boundary between the area 11a and the area 11b) of the diffractive optical element 3a to the boundary between the area 11c and the area 11a and a distance to the boundary between the area 11b and the lid, L2 indicates a distance from the optical axis (boundary between the area 11a and the area 11b) of the diffractive optical element 3a to the boundary between the area 11e and the area 11c and a distance to the boundary between the area 11d and the area 11f, and L3 indicates a distance from the optical axis (boundary between the area 11a and the area 11b) of the diffractive optical element 3a to the boundary between the area 11g and the area 11e and a distance to the boundary between the area 11f and the area 11h.

Assuming that the wavelength of the semiconductor laser 1 is $\lambda$, the focal length of the objective lens 6 is f, the numerical aperture in the objective lens 6 is NA, the pitch of a groove in the disk 7 of the groove recording system is Tp1, and the pitch of a groove in the disk 7 of the land/groove recording system is Tp2, R=f*NA and D2=f*$\lambda$/Tp2 are established. Further, L1=f*$\lambda$*(2/Tp2−1/Tp1), L2=f*$\lambda$*(1/Tp1−1/Tp2), and L3=f*$\lambda$/Tp2 are also established. Here, assuming that $\lambda$=405 nm, f=3.05 mm, NA=0.65, Tp1=0.4 µm, and Tp2=0.68 µm, the following results are obtained: R=1.98 mm, D2=1.82 mm, L1=0.55 mm, L2=1.27 mm, L3=1.82 mm. Note that when a lens system is inserted in between the diffractive optical element 3a and the objective lens 6, values of L1 to L3 on the diffractive optical element 3a are corrected, with respect to the values of L1 to L3 described above, according to the multiplying factor of the lens system.

A push-pull signal is detected by using the fact that a light reflected from the disk 7 and a light diffracted from the disk 7 are interfered with each other at a part where they are overlapped, and the intensities of the lights interfered are changed by respective phases. In the part where the sub-beam reflected from the disk 7 and the sub-beam diffracted from the disk 7 are overlapped, if phases of the both are shifted by $\pi$ to each other, a push-pull signal of the sub-beam has the inverse polarity to that of a push-pull signal of the main beam. In contrast, if the phases of the both sub-beams coincide with each other, a push-pull signal of the sub-beam has the polarity the same as that of a push-pull signal of the main beams.

FIGS. 13(a) and 13(b) show calculation examples of the relationships between the off-track amount and push-pull signals in the case of using a disk of groove recording system with a narrow pitch of groove as the disk 7. As conditions of calculation, the groove depth of the disk 7 is set to 0.1$\lambda$, in addition to the conditions described in FIG. 11. FIG. 13(a) shows the relationship between the off-track amount and a push-pull signal of the main beam, and FIG. 13(b) shows the relationship between the off-track amount and a push-pull signal of the sub-beam. Further, white circles show the calculation results in the case of the lens shift amount being 0 µm, gray circles show the calculation results in the case of the lens shift amount being 100 µm, and black circles show the calculation results in the case of the lens shift amount being 200 μm. The horizontal axes of the Figures are standardized by the pitch of a groove of the disk 7, and the vertical axes thereof are standardized by the level of a sum signal in the case where there is no groove in the disk 7.

In FIG. 11, the area 18g of the 0th-order light and the area 19d of the +1st-order diffracted light, the area 18e of the 0th-order light and the area 19f of the +1st-order diffracted light, and the area 18c of the 0th-order light and the area 19h of the +1st-order diffracted light are overlapped, respectively, and the area 18d of the 0th-order light and the area 20g of the −1st-order diffracted light, the area 18f of the 0th-order light and the area 20e of the −1st-order diffracted light, and the area 18h of the 0th-order light and the area 20c of the −1st-order diffracted light are overlapped, respectively. In the area 18g and the area 19d, in the area 18e and the area 19f, and in the area 18c and the area 19h, phases of the lights are shifted by π to each other, and in the area 18d and the area 20g, in the area 18f and the area 20e, and in the area 18h and the area 20c, phases of the lights are shifted by π to each other. Therefore, a push-pull signal of the sub-beam has the inverse polarity to that of a push-pull signal of the main beam.

If there is a lens shift, the boundary between adjacent two areas among the areas 18a to 18h, the boundary between adjacent two areas among the areas 19a to 19h, and the boundary between adjacent two areas among the areas 20a to 20h are shifted to the left side or the right side in FIG. 11 according to the direction of the lens shift. If these boundaries are shifted to the left side in FIG. 11, the width of the part where the area 18g of the 0th-order light and the area 19d of the +1st-order diffracted light are overlapped becomes narrower, the width of the part where the area 18e of the 0th-order light and the area 19f of the +1st-order diffracted light are overlapped remains unchanged, the width of the part where the area 18c of the 0th-order light and the area 19h of the +1st-order diffracted light are overlapped becomes wider, the width of the part where the area 18d of the 0th-order light and the area 20g of the −1st-order diffracted light are overlapped becomes narrower, the width of the part where the area 18f of the 0th-order light and the area 20e of the −1st-order diffracted light remains unchanged, and the width of the part where the area 18h of the 0th-order light and the area 20c of the −1st-order diffracted light are overlapped becomes wider.

Due to the reasons described above, a push-pull signal of the sub-beam has the inverse polarity to that of a push-pull signal of the main beam, which is obvious by comparing FIG. 13(a) with FIG. 13(b). Further, the amplitude of the push-pull signal of the sub-beam is the same as that of the push-pull signal of the main beam, not depending on the lens shift amount.

On the other hand, in either FIG. 13(a) or FIG. 13(b), offsets of the same sign are generated in push-pull signals if there is a lens shift, and the offset amount increases as the lens shift amount increases. Although the sign of the offset is negative here, the sign of the offset is changed to positive if the direction of the lens shift is reversed.

FIGS. 14(a) and 14(b) show calculation examples of the relationships between the off-track amount and a track error signal and between the off-track amount and a lens position signal in the case of using a disk of groove recording system with a narrow pitch of groove as the disk 7. The conditions of calculation are the same as those described for FIGS. 13(a) and 13(b). FIG. 14(a) shows the relationship between the off-track amount and a track error signal by means of a differential push-pull method, and FIG. 14(b) shows the relationship between the off-tack amount and a lens position signal. Further, white circles indicate calculation results in the case of the lens shift amount being 0 μm, gray circles indicate calculation results in the case of the lens shift amount being 100 μm, and black circles indicate calculation results in the case of the lens shift amount being 200 μm.

The horizontal axes in the Figures are standardized by the pitch of a groove of the disk 7. Assuming that sum signals of main beams and sub-beams are SUMM and SUMS, respectively, the vertical axes of FIGS. 13(a) and 13(b) are given by PPM/SUMM and PPS/SUMS, respectively. Here, assuming that $\alpha=\beta=$SUMM/SUMS, the vertical axis of FIG. 14(a) is (PPM/SUMM−PPS/SUMS)/2=TE/(SUMM+$\alpha$*SUMS), and the vertical axis of FIG. 14(b) is (PPM/SUMM+PPS/SUMS)/2=LP/(SUMM+$\beta$*SUMS). That is, the vertical axis of FIG. 14(a) is standardized by SUMM+$\alpha$*SUMS, and the vertical axis of FIG. 14(b) is standardized by SUMM+$\beta$*SUMS.

In FIG. 14(a), an offset of a push-pull signal due to a lens shift is canceled by obtaining the difference between a push-pull signal of the main beam and a push-pull signal of the sub-beam, whereby a fine track error signal not causing an offset is obtained even though there is a lens shift. Further, the amplitude of the track error signal is constant, not depending on the lens shift amount.

On the other hand, in FIG. 14(b), a component (groove crossing noise) which varies depending on the off-track amount is canceled by obtaining the sum of a push-pull signal of the main beam and a push-pull signal of the sub-beam, not depending on the lens shift amount, so that a fine lens position signal without a groove crossing noise is obtained.

FIGS. 15(a) and 15(b) show calculation examples of the relationships between the off-track amount and push-pull signals in the case of using a disk of land/groove recording system with a wide pitch of groove as the disk 7. As the calculation conditions, the groove depth of the disk 7 is set to 0.18 λ, in addition to the conditions described for FIG. 12. FIG. 15(a) shows the relationship between the off-track amount and a push-pull signal of the main beam, and FIG. 15(b) shows the relationship between the off-track amount and a push-pull signal of the sub-beam. Further, white circles show the calculation results in the case of the lens shift amount being 0 μm, gray circles show the calculation results in the case of the lens shift amount being 100 μm, and black circles show the calculation results in the case of the lens shift amount being 200 μm. The horizontal axes of the Figures are standardized by the pitch of a groove of the disk 7, and the vertical axes thereof are standardized by the level of a sum signal in the case where there is no groove in the disk 7.

In FIG. 12, the area 18g of the 0th-order light and the area 19a of the +1st-order diffracted light, the area 18e of the 0th-order light and the area 19b of the +1st-order diffracted light, the area 18c of the 0th-order light and the area 19d of the +1st-order diffracted light, the area 18a of the 0th-order light and the area 19f of the +1st-order diffracted light, and the area 18b of the 0th-order light and the area 19h of the +1st-order diffracted light are overlapped, respectively, and the area 18a of the 0th-order light and the area 20g of the −1st-order diffracted light, the area 18b of the 0th-order light and the area 20e of the −1st-order diffracted light, the area 18d of the 0th-order light and the area 20c of the −1st-order diffracted light, the area 18f of the 0th-order light and the area 20a of the −1st-order diffracted light, and the area 18h of the 0th-order light and the area 20b of the −1st-order diffracted light are overlapped, respectively. In the area 18g and the area 19a, in the area 18e and the area 19b, in the area 18c and the area 19d, in the area 18a and the area 19f, and in the area 18b and the area 19h, phases of the lights are shifted by π to each other, and in the area 18a and the area 20g, in the area 18b and the area 20e, in the area 18d and the area 20c, in the area 18f and the area 20a, and in the area 18h and the area 20b, phases of the lights are shifted by π to each other. Therefore, a push-pull signal of the sub-beam has the inverse polarity to that of a push-pull signal of the main beam.

If there is a lens shift, the boundary between adjacent two areas among the areas 18a to 18h, the boundary between adjacent two areas among the areas 19a to 19h, and the boundary between adjacent two areas among the areas 20a to 20h are shifted to the left side or the right side in FIG. 12 according to the direction of the lens shift. If these boundaries are shifted to the left side in FIG. 12, the width of the part where the area 18g of the 0th-order light and the area 19a of the +1st-order diffracted light are overlapped becomes narrower, the width of the part where the area 18e of the 0th-order light and the area 19b of the +1st-order diffracted light are overlapped remains unchanged, the width of the part where the area 18c of the 0th-order light and the area 19d of the +1st-order diffracted light are overlapped remains unchanged, the width of the part where the area 18a of the 0th-order light and the area 19f of the +1st-order diffracted light are overlapped remains unchanged, the width of the part where the area 18b of the 0th-order light and the area 19h of the +1st-order diffracted light becomes wider, the width of the part where the area 18a of the 0th-order light and the area 20g of the −1st-order diffracted light are overlapped becomes narrower, the width of the part where the area 18b of the 0th-order light and the area 20e of the −1st-order diffracted light are overlapped remains unchanged, the width of the part where the area 18d of the 0th-order light and the area 20c of the −1st-order diffracted light are overlapped remains unchanged, the width of the part where the area 18f of the 0th-order light and the area 20a of the −1st-order diffracted light are overlapped remains unchanged, and the width of the part where the area 18h of the 0th-order light and the area 20b of the −1st-order diffracted light are overlapped becomes wider.

Due to the reasons described above, a push-pull signal of the sub-beam has the inverse polarity to that of a push-pull signal of the main beam, which is obvious by comparing FIG. 15 (a) with FIG. 15(b). Further, the amplitude of a push-pull signal of the sub-beam is the same as that of a push-pull signal of the main beam, not depending on the amount of lens shift.

On the other hand, in either FIG. 15(a) or FIG. 15(b), offsets of the same sign are generated in push-pull signals if there is a lens shift, and the offset amount increases as the lens shift amount increases. Although the sign of the offset is negative here, the sign of the offset is changed to positive if the direction of the lens shift is reversed.

FIGS. 16(a) and 16(b) show calculation examples of the relationships between the off-track amount and a track error signal and between the off-track amount and a lens position signal in the case of using a disk of land/groove recording system with a wide pitch of groove as the disk 7. The conditions of calculation are the same as those described for FIGS. 15(a) and 15(b). FIG. 16(a) shows the relationship between the off-track amount and a track error signal by means of a differential push-pull method, and FIG. 16(b) shows the relationship between the off-tack amount and a lens position signal. Further, white circles indicate calculation results in the case of the lens shift amount being 0 μm, gray circles indicate calculation results in the case of the lens shift amount being 100 μm, and black circles indicate calculation results in the case of the lens shift amount being 200 μm.

The horizontal axes in the Figures are standardized by the pitch of a groove of the disk 7. Assuming that sum signals of the main beams and the sub-beams are SUMM and SUMS, respectively, the vertical axes of FIGS. 15(a) and 15(b) are given by PPM/SUMM and PPS/SUMS, respectively. Here, assuming that α=β=SUMM/SUMS, the vertical axis of FIG. 16(a) is (PPM/SUMM−PPS/SUMS)/2=TE/(SUMM+α*SUMS), and the vertical axis of FIG. 16(b) is (PPM/SUMM+PPS/SUMS)/2=LP/(SUMM+β*SUMS). That is, the vertical axis of FIG. 16(a) is standardized by SUMM+α*SUMS, and the vertical axis of FIG. 16(b) is standardized by SUMM+β*SUMS.

In FIG. 16(a), an offset of a push-pull signal due to a lens shift is canceled by obtaining the difference between a push-pull signal of the main beam and a push-pull signal of the sub-beam, whereby a fine track error signal not causing an offset is obtained even though there is a lens shift. Further, the amplitude of the track error signal is almost constant, not depending on the lens shift amount.

On the other hand, in FIG. 16(b), if there is no lens shift, a component (groove crossing noise) which varies depending on the off-track amount is canceled by obtaining the sum of a push-pull signal of the main beam and a push-pull signal of the sub-beam, so that a fine lens position signal without a groove crossing noise is obtained. However, even if there is a lens shift, the groove crossing noise is canceled significantly by obtaining the sum of the push-pull signal of the main beam and the push-pull signal of the sub-beam. Therefore, a quite fine lens position signal in which the groove crossing noise is small is obtained. The ratio of the amplitude of the groove crossing noise to a DC component of the lens position signal is about 0.59, which is small.

As described above, in the first embodiment of the optical head device of the present invention, it is possible to obtain fine track error signals and lens position signals even though there is a lens shift with respect to both optical recording medium of a groove recording system with a narrow pitch of groove and of a land/groove recording system with a wide pitch of groove.

A second embodiment of an optical head device according to the present invention is one in which the diffractive optical element 3e in the optical head device shown in FIG. 1 is replaced with a diffractive optical element 3b.

Figure 17:
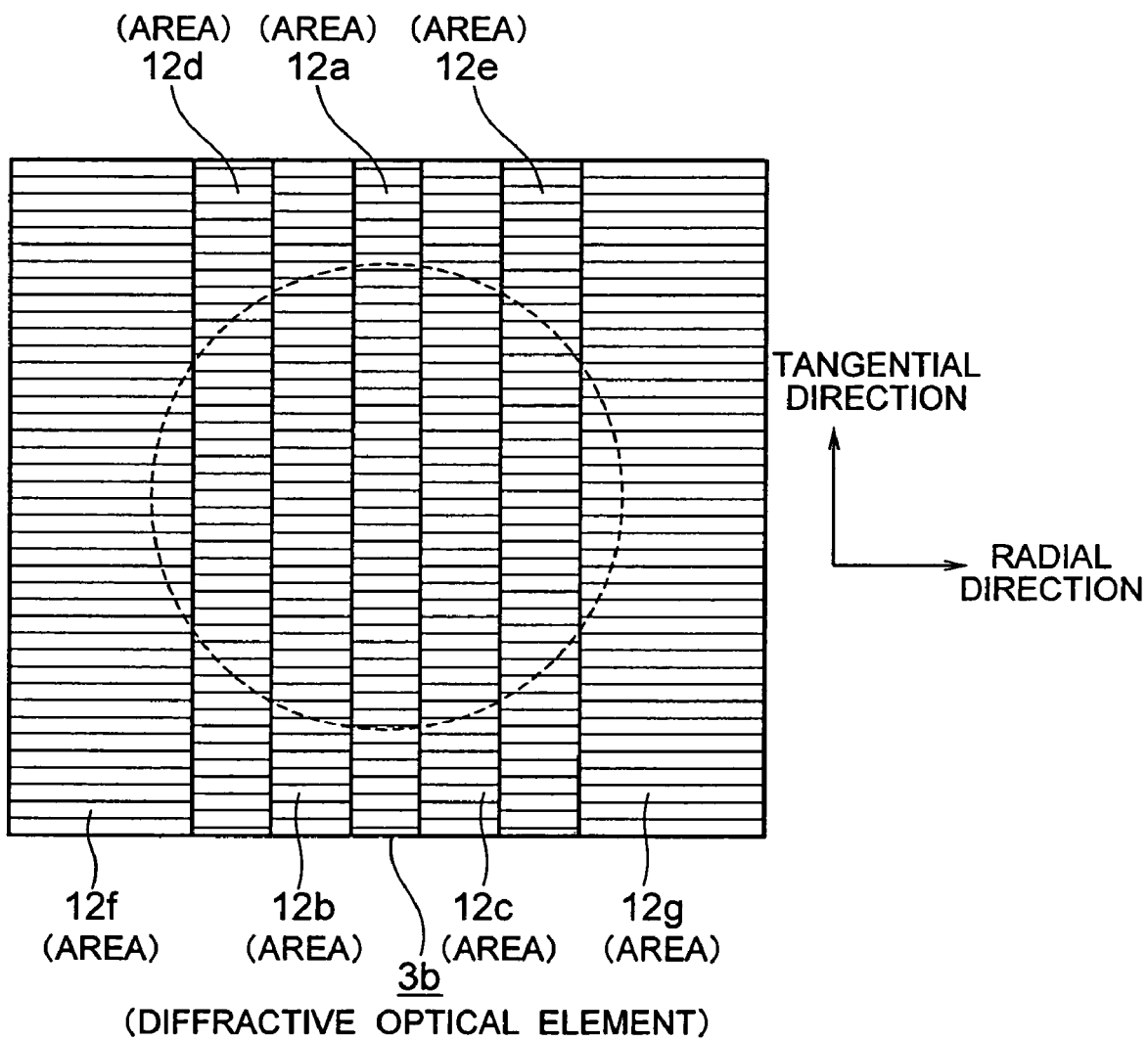
FIG. 17 is a plan view showing a diffractive optical element in a second embodiment of an optical head device according to the present invention.

FIG. 17 is a plan view of the diffractive optical element 3b. The diffractive optical element 3b is so configured to have a diffraction grating divided into seven areas 12a to 12g by six lines symmetrical with respect to the optical axis of an incident light and in parallel with the direction corresponding to the tangential direction of the disk 7. The directions of the lattices in the diffraction gratings are in parallel with the direction corresponding to the radial direction of the disk 7 and its pattern is in a linear form at even intervals. In the areas 12a to 12g, all intervals in the lattice are equal. Phases of the lattices in the areas 12a, 12d and 12e and phases of the lattices in the areas 12b, 12c, 12f and 12g are shifted by π to each other. In FIG. 17, the dotted line shows the effective diameter of the objective lens 6.

Here, it is assumed that the wavelength of the semiconductor laser 1 is λ, the refractive index of the lattice is n, the height of the lattice is h, and h=0.115μ/(n−1). Here, the transmission factor of the lattice is about 87.5%, and the +1st-order diffraction efficiency is about 5.1%, respectively. That is, as for the light made incident on the areas 12a to 12g, about 87.5% thereof transmits through as the 0th-order light, and about 5.1% thereof is diffracted as each of the ±1st-order diffraction efficiency. The phases of the +1st-order diffracted lights from the areas 12a, 12d, and 12e and the phases of the +1st-order diffracted lights from the areas 12b, 12c, 12f and 12g are shifted by π to each other. Similarly, the phases of the −1st-order diffracted lights from the areas 12a, 12d and 12e and the phases of the −1st-order diffracted lights from the areas 12b, 12c, 12f and 12g are shifted by π to each other.

On the disk 7, there are formed three focused spots corresponding to the 0th-order light, the +1st-order diffracted light and the −1st-order diffracted light from the diffracted optical element 3b. The three focused spots are located on the same track on the disk 7.

The patterns of the light receiving sections of the photodetector 10 and the arrangement of the light spots on the photodetector 10 in the present embodiment are the same as those shown in FIG. 3. In the present embodiment, focus error signals, push-pull signals of the main beam, push-pull signal of the sub-beam, track error signals of the differential push-pull system, lens position signals and RF signals are obtained by means of a method the same as that described for the optical head device shown in FIG. 1.

Figure 18:
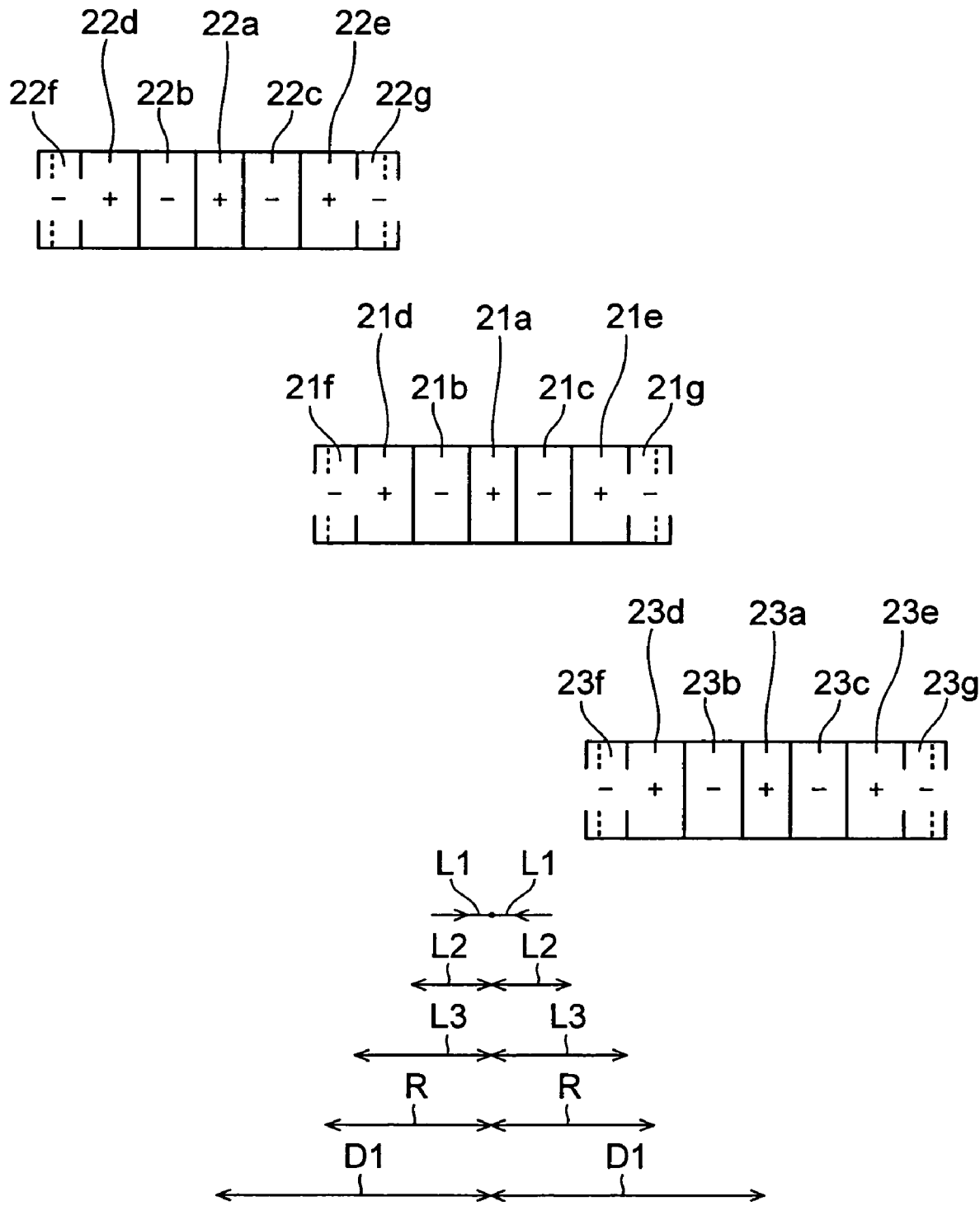
FIG. 18 is a diagram showing phases of a sub-beam reflected from a disk and of sub-beams diffracted from the disk, relating to a disk of the groove recording system with a narrow pitch of groove.

FIG. 18 shows phases of a sub-beam reflected from the disk 7 and of sub-beams diffracted from the disk 7 in a case of using a disk of groove recording system with a narrow pitch of groove as the disk 7. It is assumed that the focused spots, which are sub-beams, are located at the center of the track of the disk 7. Areas 21a to 21g correspond to diffracted lights, diffracted from the areas 12a to 12g of the diffractive optical element 3b respectively, of the sub-beam reflected from the disk 7 as the 0th-order light. Areas 22a to 22g correspond to diffracted lights, diffracted from the areas 22a to 22g of the diffractive optical element 3b respectively, of the sub-beam diffracted from the disk 7 as the +1st-order diffraction light. Areas 23a to 23g correspond to diffracted lights, diffracted from the areas 12a to 12g of the diffractive optical element 3b respectively, of the sub-beam diffracted from the disk 7 as the −1st-order diffracted light. In an area indicated as + and an area indicated as −, phases of lights are shifted by π to each other. Note that dotted lines shown in FIG. 18 indicate the effective diameter of the objective lens 6.

In FIG. 18, R indicates an effective radius of the objective lens 6, D1 indicates a distance between the centers of the sub-beam reflected from the disk 7 and the sub-beam diffracted from the disk 7 on the pupil face of the objective lens 6, L1 indicates a distance from the optical axis of the diffractive optical element 3b to the boundary between the area 12b and the area 12a and a distance to the boundary between the area 12a and the area 12c, L2 indicates a distance from the optical axis of the diffractive optical element 3b to the boundary between the area 12d and the area 12b and a distance to the boundary between the area 12c and the area 12e, and L3 indicates a distance from the optical axis of the diffractive optical element 3b to the boundary between the area 12f and the area 12d and a distance to the boundary between the area 12e and the area 12g.

Assuming that the wavelength of the semiconductor laser 1 is $\lambda$, the focal length of the objective lens 6 is f, the numerical aperture in the objective lens 6 is NA, the pitch of grove in the disk 7 of the groove recording system is Tp1, and the pitch of groove in the disk 7 of the land/groove recording system is Tp2, $R = f*NA$ and $D1 = f*\lambda/Tp1$ are established. Further, the following equations are also established: $L1 = f*\lambda*(1/Tp2 - 1/2Tp1)$, $L2 = f*\lambda/2Tp2$, and $L3 = f*\lambda*2/Tp1$. Here, assuming that $\lambda = 405$ nm, $f = 3.05$ mm, $NA = 0.65$, $Tp1 = 0.4$ μm, and $Tp2 = 0.68$ μm, the following results are obtained: $R = 1.98$ mm, $D1 = 3.09$ mm, $L1 = 0.27$ mm, $L2 = 0.91$ mm, and $L3 = 1.55$ mm. Note that when a lens system is inserted in between the diffractive optical element 3b and the objective lens 6, values of L1 to L3 on the diffractive optical element 3b are corrected, with respect to the values of L1 to L3 described above, according to the multiplying factor of the lens system.

FIG. 19 shows phases of a sub-beam reflected from the disk 7 and of sub-beams diffracted from the disk 7 in a case of using a disk of land/groove recording system with a wide pitch of groove as the disk 7. It is assumed that focused spots, which are sub-beams, are located at the center of the track of the disk 7. Areas 21a to 21g correspond to diffracted lights, diffracted from the areas 12a to 12g of the diffractive optical element 3b respectively, of the sub-beam reflected from the disk 7 as the 0th-order light. Areas 22a to 22g correspond to diffracted lights, diffracted from the areas 12a to 12g of the diffractive optical element 3b respectively, of the sub-beam diffracted from the disk 7 as the +1st-order diffraction light. Areas 23a to 23g correspond to diffracted lights from the areas 12a to 12g of the diffractive optical element 3b respectively, of the sub-beam diffracted from the disk 7 as the −1st-order diffracted light. In an area indicated as + and an area indicated as −, phases of lights are shifted by π to each other. Note that dotted lines shown in FIG. 19 indicate the effective diameter of the objective lens 6.

In FIG. 19, R indicates an effective radius of the objective lens 6, D2 indicates a distance between the centers of the sub-beam reflected from the disk 7 and the sub-beam diffracted from the disk 7 on the pupil face of the objective lens 6, L1 indicates a distance from the optical axis of the diffractive optical element 3b to the boundary between the area 12b and the area 12a and a distance to the boundary between the area 12a and the 12c, L2 indicates a distance from the optical axis of the diffractive optical element 3b to the boundary between the area 12d and the area 12b and a distance to the boundary between the area 12c and the area 12e, and L3 indicates a distance from the optical axis of the diffractive optical element 3b to the boundary between the area 12f and the area 12d and a distance to the boundary between the area 12e and the area 12g.

Assuming that the wavelength of the semiconductor laser 1 is $\lambda$, the focal length of the objective lens 6 is f, the numerical aperture in the objective lens 6 is NA, the pitch of groove in the disk 7 of the groove recording system is Tp1, and the pitch of groove in the disk 7 of the land/groove recording system is Tp2, $R = f*NA$ and $D2 = f*\lambda/Tp2$ are established. Further, the following equations are also established: $L1 = f*\lambda*(1/Tp2 - 1/2Tp1)$, $L2 = f*\lambda/2Tp2$, and $L3 = f*\lambda/2Tp1$. Here, assuming that $\lambda = 405$ nm, $f = 3.05$ mm, $NA = 0.65$, $Tp1 = 0.4$ μm, and $Tp2 = 0.68$ μm, the following results are obtained: $R = 1.98$ mm, $D2 = 1.82$ mm, $L1 = 0.27$ mm, $L2 = 0.91$ mm, and $L3 = 1.55$ mm. Note that when a lens system is inserted in between the diffractive optical element 3b and the objective lens 6, values of L1 to L3 on the diffractive optical element 3b are corrected, with respect to the values of L1 to L3 described above, according to the multiplying factor of the lens system.

A push-pull signal is detected by using the fact that a light reflected from the disk 7 and a light diffracted from the disk 7 are interfered with each other at a part where they are overlapped, and the intensities of the lights interfered are changed by respective phases. In the part where the sub-beam reflected from the disk 7 and the sub-beam diffracted from the disk 7 are overlapped, if the phases of the both are shifted by π to each other, a push-pull signal of the sub-beam has the inverse polarity to that of a push-pull signal of the main beam. In contrast, if the phases of the both sub-beams coincide with each other, a push-pull signal of the sub-beam has the polarity the same as that of a push-pull signal of the main beam.

Calculation examples of the relationships between the off-track amount and a push-pull signal where the disk 7 is of a groove recording system with a narrow pitch of groove are the same as those shown in FIG. 4.

In FIG. 18, the area 21f of the 0th-order light and the area 22e of the +1st-order diffracted light, and the area 21d of the 0th-order light and the area 22g of the +1st-order diffracted light are overlapped, respectively, and the area 21e of the 0th-order light and the area 23f of the −1st-order diffracted light, and the area 21g of the 0th-order light and the area 23d of the −1st-order diffracted light are overlapped, respectively. In the area 21f and the area 22e, and in the area 21d and the area 22g, phases of the lights are shifted by π to each other, and in the area 21e and the area 23f, and in the area 21g and the area 23d, phases of the lights are shifted by π to each other. Therefore, a push-pull signal of the sub-beam has the inverse polarity to that of a push-pull signal of the main beam.

If there is a lens shift, the boundary between adjacent two areas among the areas 21a to 21g, the boundary between adjacent two areas among the areas 22a to 22g, and the boundary between adjacent two areas among the areas 23a to 23g are shifted to the left side or the right side in FIG. 18 according to the direction of the lens shift. If these boundaries are shifted to the left side in FIG. 18, the width of the part where the area 21f of the 0th-order light and the area 22e of the +1st-order diffracted light are overlapped becomes narrower, the width of the part where the area 21d of the 0th-order light and the area 22g of the +1st-order diffracted light are overlapped becomes wider, the width of the part where the area 21e of the 0th-order light and the area 23f of the −1st-order diffracted light are overlapped becomes narrower, and the width of the part where the area 21g of the 0th-order light and the area 23d of the −1st-order diffracted light are overlapped becomes wider.

Due to the reasons described above, the push-pull signal of the sub-beam has the inverse polarity to that of the push-pull signal of the main beam, which is obvious by comparing FIG. 13(a) with FIG. 13(b). Further, the amplitude of the push-pull signal of the sub-beam is the same as the amplitude of the push-pull signal of the main beam, not depending on the amount of lens shift.

On the other hand, in either FIG. 13(a) or FIG. 13(b), an offset of the same sign is generated in the push-pull signal if there is a lens shift, and the offset amount increases as the lens shift amount increases. Although the sign of the offset is negative here, the sign of the offset is changed to positive if the direction of the lens shift is reversed.

Calculation examples of the relationships between the off-track amount and a track error signal and between the off-track amount and a lens position signal when the disk 7 is of a groove recording system with a narrow pitch of groove are the same as those shown in FIGS. 14(a) and 14(b).

In FIG. 14(a), an offset of the push-pull signal due to a lens shift is canceled by obtaining the difference between a push-pull signal of the main beam and a push-pull signal of the sub-beam, whereby a fine track error signal not causing an offset is obtained even though there is a lens shift. Further, the amplitude of the track error signal is constant, not depending of the lens shift amount.

On the other hand, in FIG. 14(b), a component (groove crossing noise) which varies depending on the off-track amount is canceled by obtaining the sum of a push-pull signal of the main beam and a push-pull signal of the sub-beam, not depending on the lens shift amount, so that a fine lens position signal without a groove crossing noise is obtained.

Calculation examples of the relationships between the off-track amount and push-pull signals when the disk 7 is of a land/groove recording system with a wide pitch of groove are the same as those shown in FIGS. 15(a) and 15(b).

In FIG. 19, the area 21f of the 0th-order light and the area 22a of the +1st-order diffracted light, the area 21d of the 0th-order light and the area 22c of the +1st-order diffracted light, the area 21b of the 0th-order light and the area 22e of the +1st-order diffracted light, and the area 21a of the 0th-order light and the area 22g of the +1st-order diffracted light are overlapped, respectively, and the area 21a of the 0th-order light and the area 23f of the −1st-order diffracted light, the area 21c of the 0th-order light and the area 23d of the −1st-order diffracted light, the area 21e of the 0th-order light and the area 23b of the −1st-order diffracted light, and the area 21g of the 0th-order light and the area 23a of the −1st-order diffracted light are overlapped, respectively. In the area 21f and the area 22a, in the area 21d and the area 22c, in the area 21b and the area 22e, and in the area 21a and the area 22g, phases of the lights are shifted by π to each other, and in the area 21a and the area 23f, in the area 21c and the area 23d, in the area 21e and the area 23b, and in the area 21g and the area 23a, phases of the lights are shifted by π to each other. Therefore, the push-pull signal of the sub-beam has the inverse polarity to that of the push-pull signal of the main beam.

If there is a lens shift, the boundary between adjacent two areas among the areas 21a to 21g, the boundary between adjacent two areas among the areas 22a to 22g, and the boundary between adjacent two areas among the areas 23a to 23g are shifted to the left side or the right side in FIG. 19 according to the direction of the lens shift. If these boundaries are shifted to the left side in FIG. 19, the width of the part where the area 21f of the 0th-order light and the area 22a of the +1st-order diffracted light are overlapped becomes narrower, the width of the part where the area 21d of the 0th-order light and the area 22c of the +1st-order diffracted light are overlapped remains unchanged, the width of the part where the area 21b of the 0th-order light and the area 22e of the +1st-order diffracted light are overlapped remains unchanged, the width of the part where the area 21a of the 0th-order light and the area 22g of the 1st-order diffracted light are overlapped becomes wider, the width of the part where the area 21a of the 0th-order light and the area 23f of the −1st-order diffracted light becomes narrower, the width of the part where the area 21c of the 0th-order light and the area 23d of the −1st-order diffracted light are overlapped remains unchanged, the width of the part where the area 21e of the 0th-order light and the area 23b of the −1st-order diffracted light are overlapped remains unchanged, and the width of the part where the area 21g of the 0th-order light and the area 23a of the −1st-order diffracted light area overlapped becomes wider.

Due to the reasons described above, the push-pull signal of the sub-beam has the inverse polarity to that of the push-pull signal of the main beam, which is obvious by comparing FIG. 15(a) with FIG. 15(b). Further, the amplitude of the push-pull signal of the sub-beam is the same as that of the push-pull signal of the main beam, not depending on the lens shift amount.

On the other hand, in either FIG. 15(a) or FIG. 15(b), offsets of the same sign are generated in push-pull signals if there is a lens shift, and the offset amount increases as the lens shift amount increases. Although the sign of the offset is negative here, the sign of the offset is changed to positive if the direction of the lens shift is reversed.

Calculation examples of the relationships between the off-track amount and a track error signal and between the off-track amount and a lens position signal, when the disk 7 is of a land-groove recording system with a wide pitch of groove, are the same as those shown in FIGS. 16(a) and 16(b).

In FIG. 16(a), an offset of a push-pull signal due to a lens shift is canceled by obtaining the difference between a push-pull signal of the main beam and a push-pull signal of the sub-beam, whereby a fine track error signal not causing an offset is obtained even though there is a lens shift. Further, the amplitude of the track error signal is almost constant, not depending on the amount of the lens shift.

On the other hand, in FIG. 16(b), if there is no lens shift, a component (groove crossing noise) which varies depending on the off-track amount is canceled by obtaining the sum of a push-pull signal of the main beam and a push-pull signal of the sub-beam, so that a fine lens position signal without a groove crossing noise is obtained. However, even though there is a lens shift, the groove crossing noise is canceled by obtaining the sum of the push-pull signal of the main beam and the push-pull signal of the sub-beam. Therefore, a quite fine lens position signal in which the groove crossing noise is small is obtained. The ratio of the amplitude of a groove crossing noise to a DC component of the lens position signal is about 0.59, which is small.

As described above, in the second embodiment of the optical head device of the present invention, it is possible to obtain fine track error signals and lens position signals even though there is a lens shift, with respect to both optical recording medium of a groove recording system with a narrow pitch of groove and of a land/groove recording system with a wide pitch of groove.

A third embodiment of an optical head device according to the present invention is one in which the diffractive optical element 3e in the optical head device shown in FIG. 1 is replaced with a diffractive optical element 3c.

Figure 20:
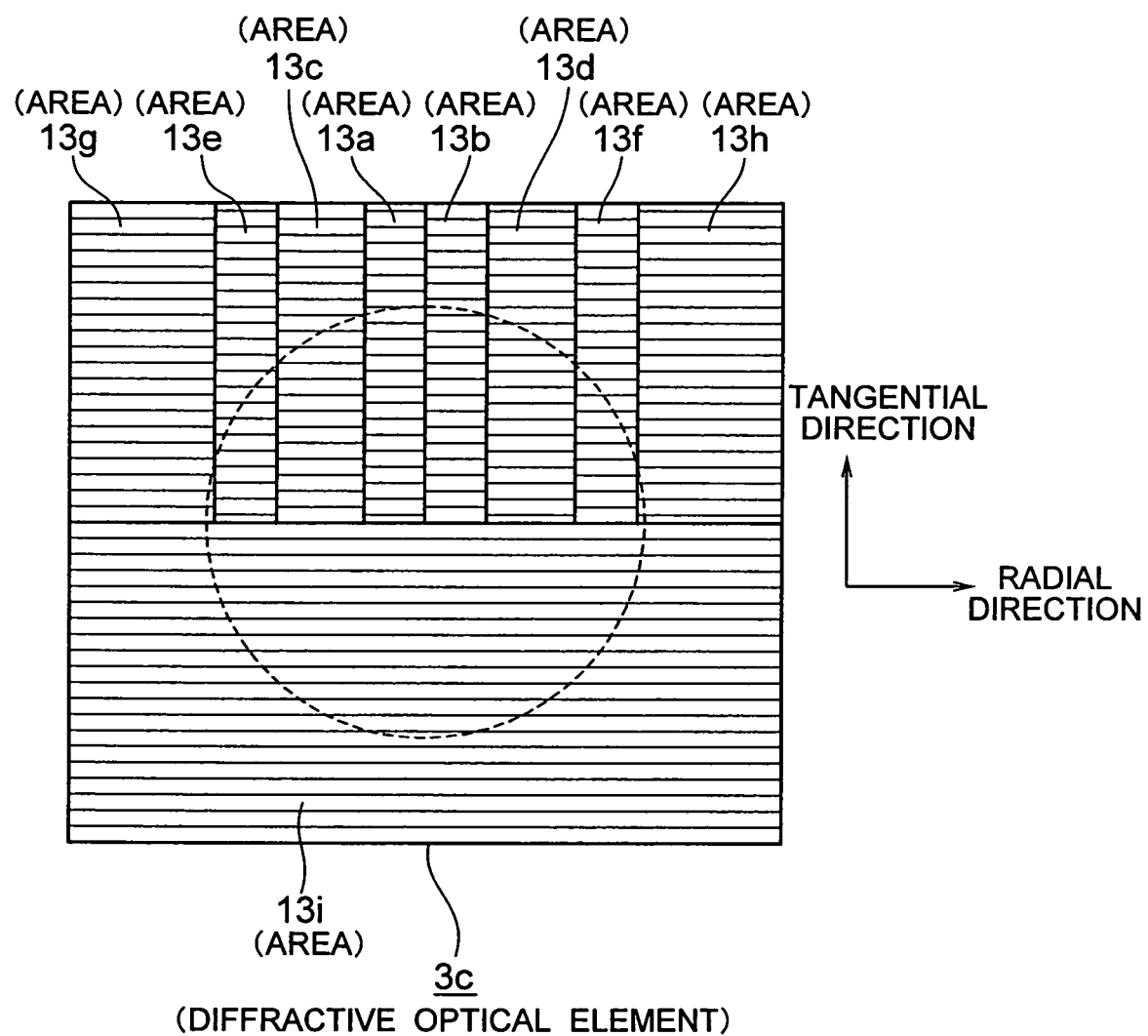
FIG. 20 is a plan view showing a diffractive optical element of a third embodiment of an optical head device according to the present invention.

FIG. 20 is a plan view of the diffractive optical element 3c. The diffractive optical element 3c is so configured that in the upper side with respect to a line passing through the optical axis of an incident light and in parallel with the direction corresponding to the radial direction of the disk 7, there is formed a diffraction grating divided into eight areas 13a to 13h, by a line passing through the optical axis of an incident light and in parallel with the direction corresponding to the tangential direction of the disk 7 and by six lines symmetrical to the optical axis of the incident light and in parallel with the direction corresponding to the tangential direction of the disk 7, and in the lower side with respect to the line passing through the optical axis of an incident light and in parallel with the direction corresponding to the radial direction of the disk 7, there is formed a diffraction grating consisting of a single area 13i. The directions of the lattices in the diffraction gratings are in parallel with the direction corresponding to the radial direction of the disk 7 and its pattern is in a linear form at even intervals. In the areas 13a to 13i, all intervals in the lattices are equal. Phases of the lattices in the areas 13a, 13d, 13e and 13h and phases of the lattices in the areas 13b, 13c, 13f and 13g are shifted by π to each other. In FIG. 20, a dotted line shows the effective diameter of the objective lens 6.

Here, it is assumed that the wavelength of the semiconductor laser 1 is λ, the refractive index of the lattice is n, the height of the lattice is h, and h=0.115 λ/(n−1). Here, the transmission factor of the lattice is about 87.5%, and the ±1st-order diffraction efficiency is about 5.1%, respectively. That is, as for the light made incident on the areas 13a to 13i, about 87.5% thereof transmits through as the 0th-order light, and about 5.1% thereof is diffracted as each of the ±1st-order diffracted light. Phases of the +1st-order diffracted lights from the areas 13a, 13d, 13e and 13h and phases of the +1st-order diffracted lights from the areas 13b, 13c, 13f and 13g are shifted by π to each other. Similarly, phases of the −1st-order diffracted lights from the areas 13a, 13d, 13e and 13h and the phases of the −1st-order diffracted lights from the areas 13b, 13c, 13f and 13g are shifted by π to each other.

On the disk 7, there are formed three focused spots corresponding to the 0th-order light, the +1st-order diffracted light and the −1st-order diffracted light from the diffracted optical element 3c. The three focused spots are located on the same track on the disk 7.

The patterns of the light receiving sections of the photodetector 10 and the arrangement of the light spots on the photodetector 10 are the same as those shown in FIG. 3.

When outputs from the light receiving sections 17a to 17l are indicated as V17a to V17l, respectively, a focus error signal is obtained from a calculation of FE=(V17a+V17d)−(V17b+V17c) by means of an astigmatism method. A push-pull signal of a diffracted light from the area 13i (a sub-beam of the lower half) of the diffractive optical element 3c, among the light spots 16b and 16c which are sub-beams, can be obtained from a calculation of PPSL=(V17f+V17j)−(V17h+V17l). A push-pull signal from diffracted lights from the areas 13a to 13h (a sub-beam of the upper half) of the diffractive optical element 3c, among the light spots 16b and 16c which are sub-beams, can be obtained from a calculation of PPSU=(V17e+V17i)−(V17g+V17k). A track error signal by means of the differential push-pull method is obtained from a calculation of TE=PPSL−PPSU. A lens position signal is obtained from a calculation of LP=PPSL+PPSU. Further, an RF signal is obtained from a calculation of RF=V17a+V17b+V17c+V17d.

Phases of the sub-beam of the upper half reflected from the disk 7 and the sub-beam of the upper half diffracted from the disk 7, in the case of using a disk of groove recording system with a narrow pitch of groove as the disk 7, are the same as those shown in FIG. 11.

Phases of the sub-beam of the upper half reflected from the disk 7 and the sub-beam of the upper half diffracted from the disk 7, in the case of using a disk of land/groove recording system with a wide pitch of groove as the disk 7, are the same as those shown in FIG. 12.

Calculation examples of the relationships between the off-track amount and push-pull signals, in the case of using a disk of groove recording system with a narrow pitch of groove as the disk 7, are the same as those shown in FIGS. 13(a) and 13(b). FIG. 13(a) shows the relationship between the off-track amount and a push-pull signal of the sub-beam of the lower half, and FIG. 13(b) shows the relationship between the off-track amount and a push-pull signal of the sub-beam of the upper half.

In the present embodiment, a push-pull signal of the sub-beam of the upper half has the inverse polarity to that of a push-pull signal of the sub-beam of the lower half, by the same reason as described in the first embodiment. Further, the amplitude of a push-pull signal of the upper-half sub-beam is equal to that of a push-pull signal of the lower half sub-beam, not depending on the lens shift amount. Further, when there is a lens shift, offsets of the same sign are generated in a push-pull signal of the lower-half sub-beam and a push-pull signal of the upper-half sub-beam, and the offset amount increases as the lens shift amount increases.

Calculation examples of the relationships between the off-track amount and a track error signal and between the off-track amount and a lens position signal, in the case of using a disk of groove recording system with a narrow pitch of groove as the disk 7, are the same as those shown in FIGS. 14(a) and 14 (b).

In the present embodiment, an offset of a push-pull signal due to a lens shift is canceled by obtaining the difference between a push-pull signal of the lower-half sub-beam and a push-pull signal of the upper-half sub-beam, whereby it is possible to obtain a fine track error signal not generating an offset even though there is a lens shift. Further, the amplitude of a track error signal is constant, not depending on the lens shift amount.

Further, a component (groove crossing noise) which varies depending on the off-track amount is canceled by obtaining the sum of a push-pull signal of the lower-half sub-beam and a push-pull signal of the upper-half sub-beam, not depending on the lens shift amount, whereby it is possible to obtain a fine lens position signal without a groove crossing noise.

Calculation examples of the relationships between the off-track amount and push-pull signals, in the case of using a disk of land/groove recording system with a wide pitch of groove as the disk 7, are the same as those shown in FIGS. 15(*a*) and 15(*b*). FIG. 15(*a*) shows the relationship between the off-track amount and a push-pull signal of the lower-half sub-beam, and FIG. 15(*b*) shows the relationship between the off-track amount and a push-pull signal of the upper-half sub-beam.

In the present embodiment, a push-pull signal of the upper-half sub-beam has the inverse polarity to that of a push-pull signal of the lower-half sub-beam, by the same reason as described in the first embodiment. Further, the amplitude of the push-pull signal of the upper-half sub-beam is equal to the amplitude of the push-pull signal of the lower half sub-beam, not depending on the lens shift amount. Further, when there is a lens shift, offsets of the same sign are generated in a push-pull signal of the lower-half sub-beam and a push-pull signal of the upper-half sub-beam, and the offset amount increases as the lens shift amount increases.

Calculation examples of the relationships between the off-track amount and a track error signal and between the off-track amount and a lens position signal, in the case of using a disk of land/groove recording system with a wide pitch of groove as the disk 7, are the same as those shown in FIGS. 16(*a*) and 16(*b*).

In the present embodiment, an offset of a push-pull signal due to a lens shift is canceled by obtaining the difference between a push-pull signal of the lower-half sub-beam and a push-pull signal of the upper-half sub-beams, whereby it is possible to obtain a fine track error signal not generating an offset even though there is a lens shift. Further, the amplitude of the track error signal is almost constant, not depending on the lens shift amount.

Further, if there is no lens shift, a component (groove crossing noise) which varies depending on the off-track amount is canceled by taking the sum of a push-pull signal of the lower-half sub-beam and a push-pull signal of the upper-half sub-beam, whereby it is possible to obtain a fine lens position signal without a groove crossing noise. Further, even thought there is a lens shift, a groove crossing noise can be canceled significantly by taking the sum of a push-pull signal of the lower-half sub-beam and a push-pull signal of the upper-half sub-beam, whereby it is possible to obtain a quite fine lens position signal with little groove crossing noise.

As described above, in the third embodiment of the optical head device of the present invention, even thought there is a lens shift, fine track error signals and fine lens position signals can be obtained with respect to both optical recording medium of a groove recording system with a narrow pitch of groove, and of a land/groove recording system with a wide pitch of groove.

If a line connecting the centers of the three focused spots on the disk 7 is not in parallel with the track of the disk 7 due to the eccentricity of the disk 7 or the like, the amplitude of a push-pull signal of the main beam is unchanged but the amplitude of a push-pull signal of the sub-beam is reduced. In the first embodiment, since the difference between a push-pull signal of the main beam and a push-pull signal of the sub-beam is defined as a track error signal, and the sum of a push-pull signal of the main beam and a push-pull signal of the sub-beam is defined as a lens position signal, the amplitude of the track error signal is reduced, so that a groove crossing noise remains in the lens position signal. However, in the third embodiment, since the difference between a push-pull signal of the lower-half sub-beam and a push-pull signal of the upper-half sub-beam is defined as a track error signal, and the sum of a push-pull signal of the lower-half sub-beam and a push-pull signal of the upper half sub-beam is defined as a lens position signal, the amplitude of the track error signal is not reduced, so that a groove crossing noise will not remain in the lens position signal.

A fourth embodiment of an optical head device according to the present invention is one in which the diffractive optical element 3*e* in the optical head device shown in FIG. 1 is replaced with a diffractive optical element 3*d*.

Figure 21:
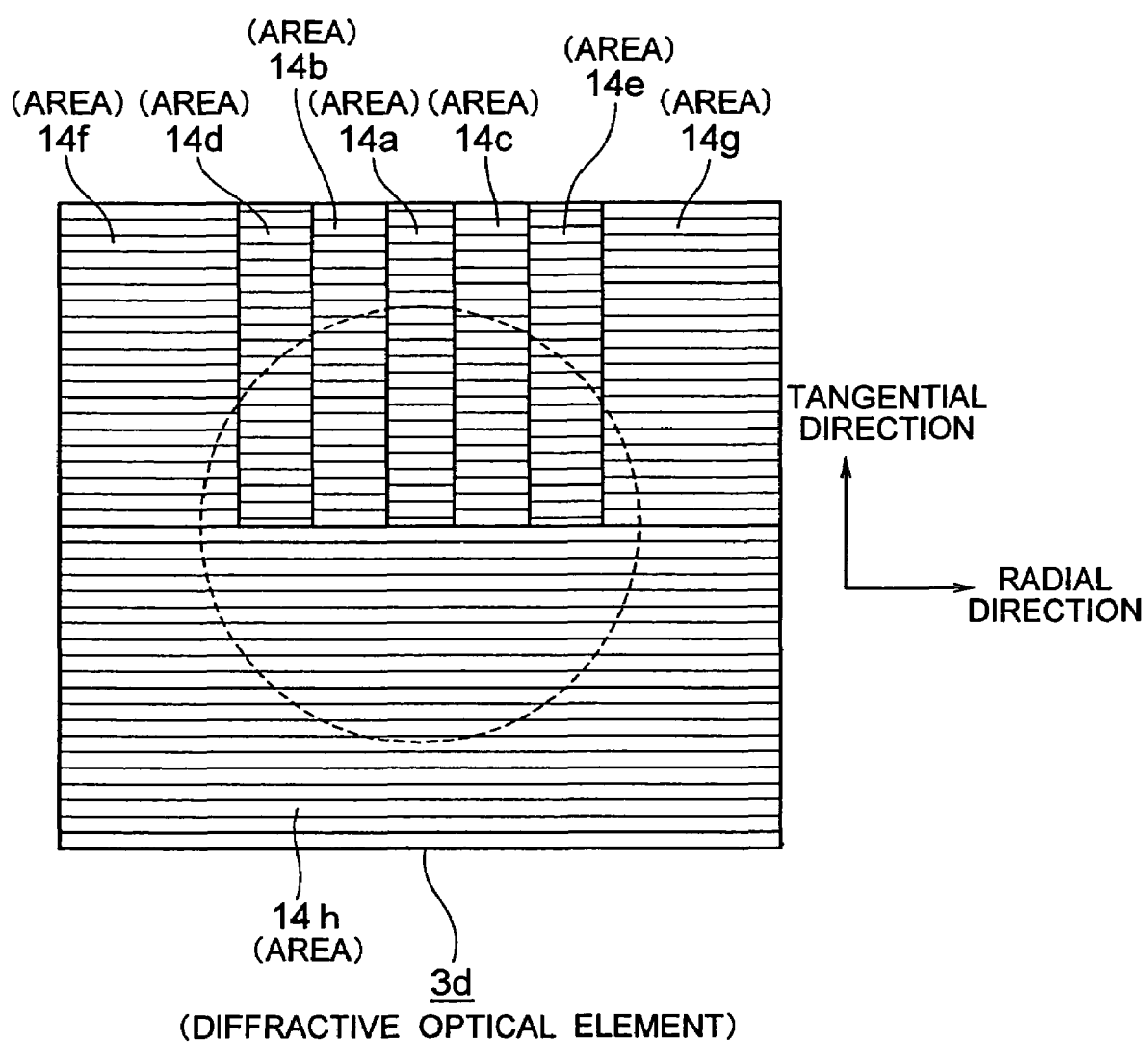
FIG. 21 is a plan view showing a diffractive optical element of a fourth embodiment of an optical head device according to the present invention.

FIG. 21 is a plan view of the diffractive optical element 3*d*. The diffractive optical element 3*d* is so configured that in the upper side with respect to a line passing through the optical axis of an incident light and in parallel with the direction corresponding to the radial direction of the disk 7, there is formed a diffraction grating divided into seven areas 14*a* to 14*g*, by six lines symmetrical to the optical axis of an incident light and in parallel with the direction corresponding to the tangential direction of the disk 7, and in the lower side with respect to the line passing through the optical axis of an incident light and in parallel with the direction corresponding to the radial direction of the disk 7, there is formed a diffraction grating consisting of a single area 14*h*. The directions of the lattices in the diffraction gratings are in parallel with the direction corresponding to the radial direction of the disk 7 and its pattern is in a linear form at even intervals. In the areas 14*a* to 14*h*, all intervals in the lattices are equal. Phases of the lattices in the areas 14*a*, 14*d* and 14*e* and phases of the lattices in the areas 14*b*, 14*c*, 14*f* and 14*g* are shifted by $\pi$ to each other. In FIG. 21, a dotted line shows the effective diameter of the objective lens 6.

Now, it is assumed that the wavelength of the semiconductor laser 1 is $\lambda$, the refractive index of the lattice is n, the height of the lattice is h, and h=0.115$\lambda$/(n−1). Here, the transmission factor of the lattice is about 87.5%, and the ±1st-order diffraction efficiency is about 5.1%, respectively. That is, as for the light made incident on the areas 14*a* to 14*h*, about 87.5% thereof transmits through as the 0th-order light, and about 5.1% thereof is diffracted as each of the ±1st-order diffracted lights. Phases of the +1st-order diffracted lights from the areas 14*a*, 14*d* and 14*e* and phases of the +1st-order diffracted lights from the areas 14*b*, 14*c*, 14*f* and 14*g* are shifted by $\pi$ to each other. Similarly, phases of the −1st-order diffracted lights from the areas 14*a*, 14*d* and 14*e* and phases of the −1st-order diffracted lights from the areas 14*b*, 14*c*, 14*f* and 14*g* are shifted by $\pi$ to each other.

On the disk 7, there are formed three focused spots corresponding to the 0th-order light, the +1st-order diffracted light and the −1st-order diffracted light from the diffracted optical element 3*d*. The three focused spots are located on the same track on the disk 7.

The patterns of the light receiving sections of the photodetector 10 and the arrangement of the light spots on the photodetector 10 in the present embodiment are the same as those shown in FIG. 3. In the present embodiment, focus error signals, push-pull signals of the lower-half sub-beams, push-pull signals of the upper-half sub-beams, track error signals of the differential push-pull method, lens position signals and RF signals are obtained by means of a method the same as that described in the third embodiment.

Phases of the upper half sub-beam reflected from the disk 7 and the upper half sub-beam diffracted from the disk 7, in the case of using a disk of groove recording system with a narrow pitch of groove as the disk 7, are the same as those shown in FIG. 18.

Phases of the upper half sub-beam reflected from the disk 7 and the upper half sub-beam diffracted from the disk 7, in the case of using a disk of land/groove recording system with a wide pitch of groove as the disk 7, are the same as those shown in FIG. 19.

Calculation examples of the relationships between the off-track amount and push-pull signals, in the case of using a disk of groove recording system with a narrow pitch of groove as the disk 7, are the same as those shown in FIGS. 13(*a*) and 13(*b*). FIG. 13(*a*) shows the relationship between the off-track amount and a push-pull signal of the sub-beam of the lower half, and FIG. 13(*b*) shows the relationship between the off-track amount and a push-pull signal of the sub-beam of the upper half.

In the present embodiment, a push-pull signal of the upper-half sub-beam has the inverse polarity to that of a push-pull signal of the lower-half sub-beam, due to the same reason as described in the second embodiment. Further, the amplitude of a push-pull signal of the upper-half sub-beam is equal to that of a push-pull signal of the lower half sub-beam, not depending on the lens shift amount. Further, when there is a lens shift, offsets of the same sign are generated in a push-pull signal of the lower-half sub-beam and a push-pull signal of the upper-half sub-beam, and the offset amount increases as the lens shift amount increases.

Calculation examples of the relationships between the off-track amount and a track error signal and between the off-track amount and a lens position signal, in the case of using a disk of groove recording system with a narrow pitch of groove as the disk 7, are the same as those shown in FIGS. 14(*a*) and 14(*b*).

In the present embodiment, an offset of a push-pull signal due to a lens shift is canceled by obtaining a difference between a push-pull signal of the lower-half sub-beam and a push-pull signal of the upper-half sub-beams, whereby it is possible to obtain a fine track error signal not generating an offset even though there is a lens shift. Further, the amplitude of the track error signal is constant, not depending on the lens shift amount.

Further, a component (groove crossing noise) which varies depending on the off-track amount is canceled by taking the sum of a push-pull signal of the lower-half sub-beam and a push-pull signal of the upper-half sub-beam, not depending on the lens shift amount, whereby it is possible to obtain a fine lens position signal without a groove crossing noise.

Calculation examples of the relationships between the off-track amount and push-pull signals, in the case of using a disk of land/groove recording system with a wide pitch of groove as the disk 7, are the same as those shown in FIGS. 15(*a*) and 15(*b*). FIG. 15(*a*) shows the relationship between the off-track amount and a push-pull signal of the lower-half sub-beam, and FIG. 15(*b*) shows the relationship between the off-track amount and a push-pull signal of the upper-half sub-beam.

In the present embodiment, a push-pull signal of the upper-half sub-beam has the inverse polarity to that of a push-pull signal of the lower-half sub-beam, by the same reason as described in the second embodiment. Further, the amplitude of the push-pull signal of the upper-half sub-beam is equal to that of the push-pull signal of the lower half sub-beam, not depending on the lens shift amount. Further, when there is a lens shift, offsets of the same sign are generated in a push-pull signal of the lower-half sub-beam and in a push-pull signal of the upper-half sub-beam, and the offset amount increases as the lens shift amount increases.

Calculation examples of the relationships between the off-track amount and a track error signal and between the off-track amount and a lens position signal, in the case of using a disk of land/groove recording system with a wide pitch of groove as the disk 7, are the same as those shown in FIGS. 16(*a*) and 16(*b*).

In the present embodiment, an offset of a push-pull signal due to a lens shift is canceled by taking the difference between a push-pull signal of the lower-half sub-beam and a push-pull signal of the upper-half sub-beam, whereby it is possible to obtain a fine track error signal not generating an offset even though there is a lens shift. Further, the amplitude of the track error signal is almost constant, not depending on the lens shift amount.

Further, if there is no lens shift, a component (groove crossing noise) which varies depending on the off-track amount is canceled by taking the sum of a push-pull signal of the lower-half sub-beam and a push-pull signal of the upper-half sub-beam, whereby it is possible to obtain a fine lens position signal without a groove crossing noise. Further, even though there is a lens shift, a groove crossing noise can be canceled significantly by taking the sum of a push-pull signal of the lower-half sub-beam and a push-pull signal of the upper-half sub-beam, whereby it is possible to obtain a quite fine lens position signal with little groove crossing noise.

As described above, in the fourth embodiment of the optical head device of the present invention, fine track error signals and fine lens position signals can be obtained with respect to both optical recording medium of groove recording system with a narrow pitch of groove and of land/groove recording system with a wide pitch of groove, even though there is a lens shift.

If a line connecting the centers of the three focused spots on the disk 7 is not in parallel with the track of the disk 7 due to the eccentricity of the disk 7 or the like, the amplitude of a push-pull signal of the main beam is unchanged but the amplitude of a push-pull signal of the sub-beam is reduced. In the second embodiment, since the difference between a push-pull signal of the main beam and a push-pull signal of the sub-beam is defined as a track error signal, and the sum of a push-pull signal of the main beam and a push-pull signal of the sub-beam is defined as a lens position signal, the amplitude of the track error signal is reduced, so that a groove crossing noise remains in the lens position signal. However, in the fourth embodiment, since the difference between a push-pull signal of the lower-half sub-beam and a push-pull signal of the upper-half sub-beam is defined as a track error signal, and the sum of a push-pull signal of the lower-half sub-beam and a push-pull signal of the upper half sub-beam is defined as a lens position signal, the amplitude of the track error signal is not reduced, so that a groove crossing noise will not remain in the lens position signal.

Figure 22:
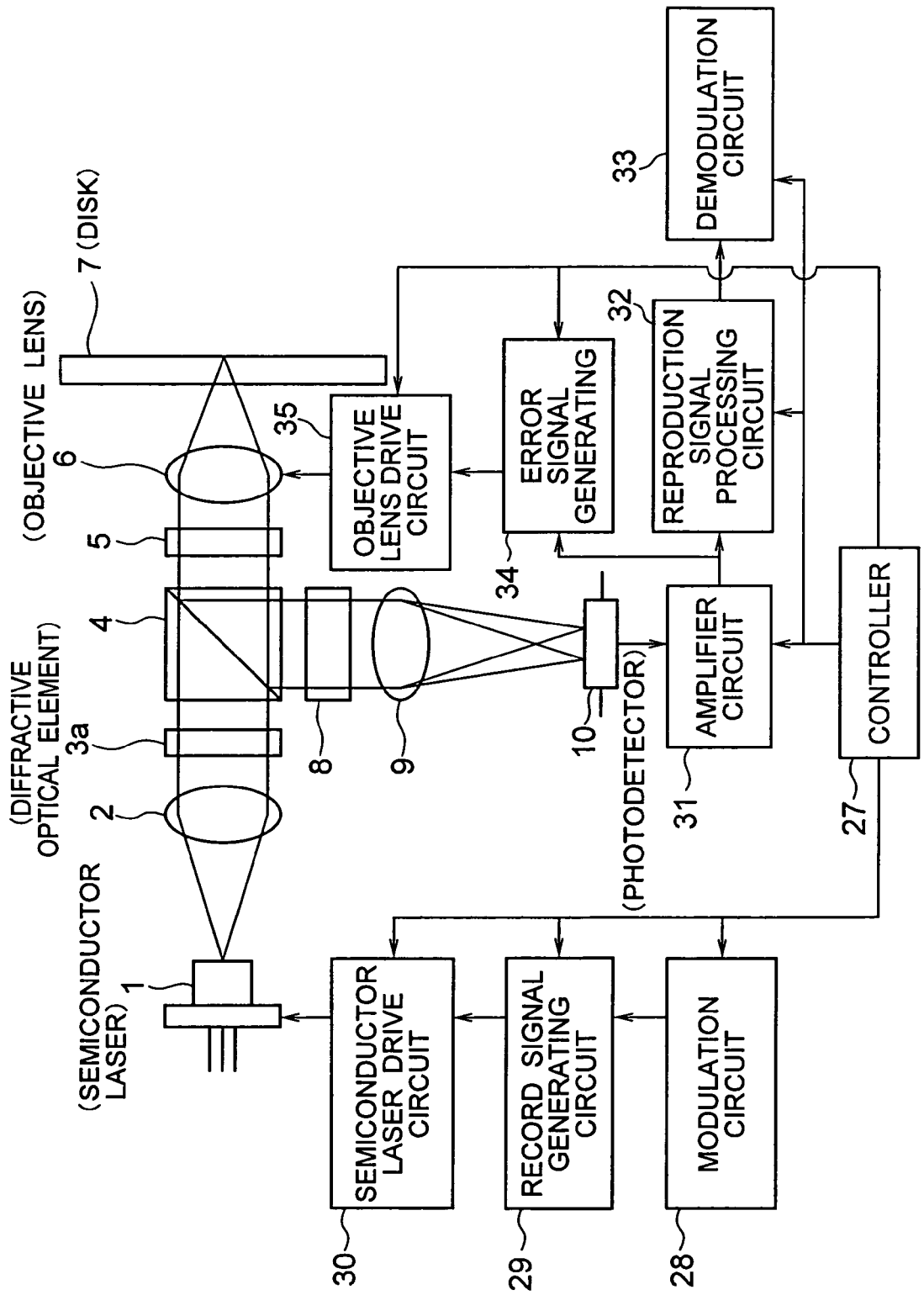
FIG. 22 is a diagram showing an embodiment of an optical information recording or reproducing device according to the present invention.

FIG. 22 shows an embodiment of an optical information recording or reproducing device according to the present invention. The present embodiment is so configured that a controller 27, a modulation circuit 28, a record signal generating circuit 29, a semiconductor laser drive circuit 30, an amplifier circuit 31, a reproduction signal processing circuit 32, a demodulation circuit 33, an error signal generating circuit 34, and an objective lens drive circuit 35 are added to the first embodiment of the optical head device according to the present invention.

The modulation circuit 28 modulates data to be written on the disk 7 in accordance with the modulation rules. The record signal generating circuit 29 generates a record signal for driving the semiconductor laser 1 in accordance with the record strategy, based on the signal modulated in the modulation circuit 28. Based on the record signal generated in the record signal generating circuit 29, the semiconductor laser drive circuit 30 supplies a current corresponding to the record signal to the semiconductor laser 1 so as to drive the semiconductor laser 1. Thereby, data is written on the disk 7.

On the other hand, the amplifier circuit 31 amplifies an output from each light receiving section of the photodetector 10. Based on the signal amplified in the amplifier circuit 31, the reproduction signal processing circuit 32 generates an RF signal and performs waveform equalization and binalization. The demodulation circuit 33 demodulates the signal binalized in the reproduction signal processing circuit 32 in accordance with the demodulation rules. Thereby, data is read from the disk 7.

Further, based on the signal amplified in the amplifier circuit 31, the error signal generating circuit 34 generates a focus error signal and a track error signal. Based on the error signals generated in the error signal generating circuit 34, the objective lens drive circuit 35 drives the objective lens 6 by supplying a current corresponding to the error signals to an actuator, not shown, for driving the objective lens 6.

Further, the optical system, except for the disk 7, is driven in the radial direction of the disk 7 by a positioner, not shown, and the disk 7 is rotationally driven by a spindle not shown. Thereby, servo of focus, track, positioner and the spindle is performed.

Circuits relating to data writing, that is, from the modulation circuit 28 to the semiconductor laser drive circuit 30, circuits relating to data reading, that is, from the amplifier circuit 31 to the demodulation circuit 33, and circuits relating to servo, that is, from the amplifier circuit 31 to the objective lens driving circuit 35, are controlled by the controller 27.

The present embodiment is a recording or reproducing device for performing recording or reproducing to the disk 7. On the other hand, as an embodiment of an optical information recording or reproducing device according to the present invention, there may be a reproduction-only device which only performs reproduction to the disk 7. In this case, the semiconductor laser 1 is driven such that the power of the emitting light takes a constant value, not being driven by the semiconductor laser drive circuit 30 based on the record signal.

An embodiment of an optical information recording or reproducing device according to the present invention may be so configured that the controller 27, the modulation circuit 28, the record signal generating circuit 29, the semiconductor laser drive circuit 30, the amplifier circuit 31, the reproduction signal processing circuit 32, the demodulation circuit 33, the error signal generating circuit 34, and the objective lens driving circuit 35 are added to the second to the fourth optical head devices of the present invention.

What is claimed is:

1. An optical head device, comprising:
   a diffractive optical element for dividing a light emitted from a light source into a main beam and at least one sub-beam in an outward path;
   an objective lens for focusing the main beam and the sub-beam divided by the diffractive optical element in the outward path on a disk-shaped optical recording medium with spiral tracks; and
   a photodetector for receiving the main beam and the sub-beam reflected from the optical recording medium in an inward path,
   wherein at least a part of the diffractive optical element includes a diffraction grating divided into a plurality of areas, which are four or more areas, by a plurality of lines, which are three or more lines, in parallel with a direction corresponding to a tangential direction of the optical recording medium, and in two adjacent areas among the plurality of areas, phases of lattices are shifted by $\pi$ to each other,
   wherein focused spots of the main beam and the sub-beam are located on a same track of the optical recording medium,
   wherein the photodetector is configured so as to detect a push-pull signal from each of the main beam and the sub-beam,
   wherein the diffractive optical element has a diffraction grating divided into eight areas, which are first to eighth areas from one end to another end, by a line passing through an optical axis of an incident light and in parallel with the direction corresponding to the tangential direction of the optical recording medium and by six lines symmetrical with respect to the optical axis of the incident light and in parallel with the direction corresponding to the tangential direction of the optical recording medium, and
   wherein phases of lattices in the first, third, fifth and seventh areas and phases of lattices in the second, fourth, sixth and eighth areas are shifted by $\pi$ to each other.

2. The optical head device, as claimed in claim 1, wherein a difference between the push-pull signal of the main beam and the push-pull signal of the sub-beam is defined as a track error signal.

3. The optical head device, as claimed in claim 1, wherein a sum of the push-pull signal of the main beam and the push-pull signal of the sub-beam is defined as a lens position signal.

4. The optical head device, as claimed in claim 1, wherein assuming that: a distance from the optical axis of the incident light to a boundary between the third area and the fourth area, and a distance from the optical axis of the incident light to a boundary between the fifth area and the sixth area are L1, respectively;
   a distance from the optical axis of the incident light to a boundary between the second area and the third area, and a distance from the optical axis of the incident light to a boundary between the sixth area and the seventh area are L2, respectively;
   a distance from the optical axis of the incident light to a boundary between the first area and the second area, and a distance from the optical axis of the incident light to a boundary between the seventh area and the eighth area are L3, respectively; and
   a wavelength of the light source is $\lambda$, a focal length of the objective lens is f, a pitch of a groove of the optical recording medium of a first kind is Tp1, and a pitch of a groove of the optical recording medium of a second kind is Tp2 (where Tp1<Tp2),
   following equations are established:

$$L1 = f * \lambda * (2/Tp2 - 1/Tp1),$$

$$L2 = f * \lambda * (1/Tp1 - 1/Tp2), \text{ and}$$

$$L3 = f * \lambda / Tp2.$$

5. An optical head device, comprising:
- a diffractive optical element for dividing a light emitted from a light source into a main beam and at least one sub-beam in an outward path;
- an objective lens for focusing the main beam and the sub-beam divided by the diffractive optical element in the outward path on a disk-shaped optical recording medium with spiral tracks; and
- a photodetector for receiving the main beam and the sub-beam reflected from the optical recording medium in an inward path,
- wherein at least a part of the diffractive optical element includes a diffraction grating divided into a plurality of areas, which are four or more areas, by a plurality of lines, which are three or more lines, in parallel with a direction corresponding to a tangential direction of the optical recording medium, and in two adjacent areas among the plurality of areas, phases of lattices are shifted by $\pi$ to each other,
- wherein focused spots of the main beam and the sub-beam are located on a same track of the optical recording medium,
- wherein the photodetector is configured so as to detect a push-pull signal from each of the main beam and the sub-beam,
- wherein the diffractive optical element has a diffraction grating divided into seven areas, which are first to seventh areas from one end to another end, by six lines symmetrical with respect to the optical axis of the incident light and in parallel with the direction corresponding to the tangential direction of the optical recording medium, and
- wherein phases of lattices in the first, third, fifth and seventh areas and phases of lattices in the second, fourth, and sixth areas are shifted by $\pi$ to each other.

6. The optical head device, as claimed in claim 5, wherein assuming that: a distance from the optical axis of the incident light to a boundary between the third area and the fourth area, and a distance from the optical axis of the incident light to a boundary between the fourth area and the fifth area are L1, respectively;
- a distance from the optical axis of the incident light to a boundary between the second area and the third area, and a distance from the optical axis of the incident light to a boundary between the fifth area and the sixth area are L2, respectively;
- a distance from the optical axis of the incident light to a boundary between the first area and the second area, and a distance from the optical axis of the incident light to a boundary between the sixth area and the seventh area are L3, respectively; and
- a wavelength of the light source is $\lambda$, a focal length of the objective lens is f, a pitch of a groove of the optical recording medium of a first kind is Tp1, and a pitch of a groove of the optical recording medium of a second kind is Tp2 (where Tp1<Tp2),
following equations are established:

$$L1 = f*\lambda*(1/Tp2 - 1/2Tp1),$$

$$L2 = f*\lambda*2/Tp2, \text{ and}$$

$$L3 = f*\lambda/2Tp1.$$

7. The optical head device, as claimed in claim 5, wherein a difference between the push-pull signal of the main beam and the push-pull signal of the sub-beam is defined as a track error signal.

8. The optical head device, as claimed in claim 5, wherein a sum of the push-pull signal of the main beam and the push-pull signal of the sub-beam is defined as a lens position signal.

9. An optical head device, comprising:
- a diffractive optical element for dividing a light emitted from a light source into a main beam and at least one sub-beam in an outward path;
- an objective lens for focusing the main beam and the sub-beam divided by the diffractive optical element in the outward path on a disk-shaped optical recording medium with spiral tracks; and
- a photodetector for receiving the main beam and the sub-beam reflected from the optical recording medium in an inward path,
- wherein at least a part of the diffractive optical element includes a diffraction grating divided into a plurality of areas, which are four or more areas, by a plurality of lines, which are three or more lines, in parallel with a direction corresponding to a tangential direction of the optical recording medium, and in two adjacent areas among the plurality of areas, phases of lattices are shifted by $\pi$ to each other,
- wherein the diffractive optical element is composed of a first part and a second part,
- wherein the photodetector detects a push-pull signal from each of a sub-beam from the first part and a sub-beam from the second part,
- wherein the second part of the diffractive optical element is provided with a diffraction grating divided into eight areas, which are first to eighth areas from one end to another end, by a line passing through an optical axis of an incident light and in parallel with the direction corresponding to the tangential direction of the optical recording medium and by six lines symmetrical with respect to the optical axis of the incident light and in parallel with the direction corresponding to the tangential direction of the optical recording medium, and
- wherein phases of lattices in the first, third, fifth and seventh areas and phases of lattices in the second, fourth, sixth and eighth areas are shifted by $\pi$ to each other.

10. The optical head device, as claimed in claim 9, wherein a difference between the push-pull signal of the sub-beam from the first part and the push-pull signal of the sub-beam from the second part is defined as a track error signal.

11. The optical head device, as claimed in claim 9, wherein a sum of the push-pull signal of the sub-beam from the first part and the push-pull signal of the sub-beam from the second part is defined as a lens position signal.

12. The optical head device, as claimed in claim 9, wherein assuming that: a distance from the optical axis of the incident light to a boundary between the third area and the fourth area, and a distance from the optical axis of the incident light to a boundary between the fifth area and the sixth area are L1, respectively;
- a distance from the optical axis of the incident light to a boundary between the second area and the third area, and a distance from the optical axis of the incident light to a boundary between the sixth area and the seventh area are L2, respectively;
- a distance from the optical axis of the incident light to a boundary between the first area and the second area, and a distance from the optical axis of the incident light to a boundary between the seventh area and the eighth area are L3, respectively; and
- a wavelength of the light source is $\lambda$, a focal length of the objective lens is f, a pitch of a groove of the optical recording medium of a first kind is Tp1, and a pitch of a groove of the optical recording medium of a second kind is Tp2 (where Tp1<Tp2),
following equations are established:

$L1 = f*\lambda*(2/Tp2 - 1/Tp1),$ $L2 = f*\lambda*(1/Tp1 - 1/Tp2),$ and $L3 = f*\lambda/Tp2.$ 13. An optical head device, comprising:
a diffractive optical element for dividing a light emitted from a light source into a main beam and at least one sub-beam in an outward path;
an objective lens for focusing the main beam and the sub-beam divided by the diffractive optical element in the outward path on a disk-shaped optical recording medium with spiral tracks; and
a photodetector for receiving the main beam and the sub-beam reflected from the optical recording medium in an inward path,
wherein at least a part of the diffractive optical element includes a diffraction grating divided into a plurality of areas, which are four or more areas, by a plurality of lines, which are three or more lines, in parallel with a direction corresponding to a tangential direction of the optical recording medium, and in two adjacent areas among the plurality of areas, phases of lattices are shifted by π to each other,
wherein the diffractive optical element is composed of a first part and a second part,
wherein the photodetector detects a push-pull signal from each of a sub-beam from the first part and a sub-beam from the second part,
wherein the second part of the diffractive optical element is provided with a diffraction grating divided into seven areas, which are first to seventh areas from one end to another end, by six lines symmetrical with respect to the optical axis of the incident light and in parallel with the direction corresponding to the tangential direction of the optical recording medium, and
wherein phases of lattices in the first, third, fifth and seventh areas and phases of lattices in the second, fourth, and sixth areas are shifted by π to each other.

14. The optical head device, as claimed in claim 13, wherein assuming that: a distance from the optical axis of the incident light to a boundary between the third area and the fourth area, and a distance from the optical axis of the incident light to a boundary between the fourth area and the fifth area are L1, respectively;
a distance from the optical axis of the incident light to a boundary between the second area and the third area, and a distance from the optical axis of the incident light to a boundary between the fifth area and the sixth area are L2, respectively;
a distance from the optical axis of the incident light to a boundary between the first area and the second area, and a distance from the optical axis of the incident light to a boundary between the sixth area and the seventh area are L3, respectively; and
a wavelength of the light source is λ, a focal length of the objective lens is f, a pitch of a groove of the optical recording medium of a first kind is Tp1, and a pitch of a groove of the optical recording medium of a second kind is Tp2 (where Tp1<Tp2),
following equations are established:

$L1 = f*\lambda*(1/Tp2 - 1/2Tp1),$ $L2 = f*\lambda/2Tp2,$ and $L3 = f*\lambda/2Tp1.$ 15. The optical head device, as claimed in claim 13, wherein a difference between the push-pull signal of the sub-beam from the first part and the push-pull signal of the sub-beam from the second part is defined as a track error signal.

16. The optical head device, as claimed in claim 13, wherein a sum of the push-pull signal of the sub-beam from the first part and the push-pull signal of the sub-beam from the second part is defined as a lens position signal.

17. An optical information recording or reproducing device, comprising: an optical head device; a first circuit for driving a light source; a second circuit for generating a reproduction signal and an error signal based on an output signal of a photodetector; and a third circuit for controlling a position of an objective lens based on the error signal, wherein
the optical head device includes:
a diffractive optical element for dividing a light emitted from a light source into a main beam and at least one sub-beam in an outward path;
an objective lens for focusing the main beam and the sub-beam divided by the diffractive optical element in the outward path on a disk-shaped optical recording medium with spiral tracks; and
the photodetector for receiving the main beam and the sub-beam reflected from the optical recording medium in an inward path,
wherein the diffractive optical element has a diffraction grating divided into eight areas, which are first to eighth areas from one end to another end, by a line passing through an optical axis of an incident light and in parallel with the direction corresponding to the tangential direction of the optical recording medium and by six lines symmetrical with respect to the optical axis of the incident light and in parallel with the direction corresponding to the tangential direction of the optical recording medium,
wherein focused spots of the main beam and the sub-beam are located on a same track of the optical recording medium,
wherein the photodetector is configured so as to detect a push-pull signal from each of the main beam and the sub-beam, and
wherein phases of lattices in the first, third, fifth and seventh areas and phases of lattices in the second, fourth, sixth and eighth areas are shifted by π to each other.

18. An optical information recording or reproducing device, comprising: an optical head device; a first circuit for driving a light source; a second circuit for generating a reproduction signal and an error signal based on an output signal of a photodetector; and a third circuit for controlling a position of an objective lens based on the error signal, wherein
the optical head device includes:
a diffractive optical element for dividing a light emitted from a light source into a main beam and at least one sub-beam in an outward path;
an objective lens for focusing the main beam and the sub-beam divided by the diffractive optical element in the outward path on a disk-shaped optical recording medium with spiral tracks; and
the photodetector for receiving the main beam and the sub-beam reflected from the optical recording medium in an inward path,
wherein the diffractive optical element has a diffraction grating divided into seven areas, which are first to seventh areas from one end to another end, by six lines symmetrical with respect to the optical axis of the incident light and in parallel with the direction corresponding to the tangential direction of the optical recording medium, wherein focused spots of the main beam and the sub-beam are located on a same track of the optical recording medium, wherein the photodetector is configured so as to detect a push-pull signal from each of the main beam and the sub-beam, and wherein phases of lattices in the first, third, fifth and seventh areas and phases of lattices in the second, fourth, and sixth areas are shifted by $\pi$ to each other.

19. An optical information recording or reproducing device, comprising: an optical head device; a first circuit for driving a light source; a second circuit for generating a reproduction signal and an error signal based on an output signal of a photodetector; and a third circuit for controlling a position of an objective lens based on the error signal, wherein the optical head device includes:

a diffractive optical element for dividing a light emitted from a light source into a main beam and at least one sub-beam in an outward path;

an objective lens for focusing the main beam and the sub-beam divided by the diffractive optical element in the outward path on a disk-shaped optical recording medium with spiral tracks; and the photodetector for receiving the main beam and the sub-beam reflected from the optical recording medium in an inward path, wherein the diffractive optical element is composed of a first part and a second part, wherein the second part of the diffractive optical element is provided with a diffraction grating divided into eight areas, which are first to eighth areas from one end to another end, by a line passing through an optical axis of an incident light and in parallel with the direction corresponding to the tangential direction of the optical recording medium and by six lines symmetrical with respect to the optical axis of the incident light and in parallel with the direction corresponding to the tangential direction of the optical recording medium, wherein the photodetector detects a push-pull signal from each of a sub-beam from the first part and a sub-beam from the second part, and wherein phases of lattices in the first, third, fifth and seventh areas and phases of lattices in the second, fourth, sixth and eighth areas are shifted by $\pi$ to each other.

20. An optical information recording or reproducing device, comprising:

an optical head device; a first circuit for driving a light source; a second circuit for generating a reproduction signal and an error signal based on an output signal of a photodetector; and a third circuit for controlling a position of an objective lens based on the error signal, wherein the optical head device includes:

a diffractive optical element for dividing a light emitted from a light source into a main beam and at least one sub-beam in an outward path;

an objective lens for focusing the main beam and the sub-beam divided by the diffractive optical element in the outward path on a disk-shaped optical recording medium with spiral tracks; and the photodetector for receiving the main beam and the sub-beam reflected from the optical recording medium in an inward path, wherein the diffractive optical element is composed of a first part and a second part, wherein the second part of the diffractive optical element is provided with a diffraction grating divided into seven areas, which are first to seventh areas from one end to another end, by six lines symmetrical with respect to the optical axis of the incident light and in parallel with the direction corresponding to the tangential direction of the optical recording medium, wherein the photodetector detects a push-pull signal from each of a sub-beam from the first part and a sub-beam from the second part, and wherein phases of lattices in the first, third, fifth and seventh areas and phases of lattices in the second, fourth, and sixth areas are shifted by $\pi$ to each other.

* * * * *